United States Patent
Hwang et al.

(10) Patent No.: US 11,718,285 B2
(45) Date of Patent: Aug. 8, 2023

(54) DEVICE AND METHOD FOR IMPROVING TURNING MOTION OF VEHICLE

(71) Applicants: Hyundai Motor Company, Seoul (KR); Kia Corporation, Seoul (KR)

(72) Inventors: Sung Wook Hwang, Whasung-Si (KR); Seung Ki Kim, Whasung-Si (KR); Sang Ho Lee, Whasung-Si (KR); Jae Il Park, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 215 days.

(21) Appl. No.: 17/384,018

(22) Filed: Jul. 23, 2021

(65) Prior Publication Data
US 2022/0080953 A1  Mar. 17, 2022

(30) Foreign Application Priority Data

Sep. 17, 2020 (KR) .................... 10-2020-0119777

(51) Int. Cl.
*B60W 30/045* (2012.01)
*B60W 10/08* (2006.01)
*B60W 10/20* (2006.01)
*B60W 10/22* (2006.01)

(52) U.S. Cl.
CPC .......... *B60W 30/045* (2013.01); *B60W 10/08* (2013.01); *B60W 10/20* (2013.01); *B60W 10/22* (2013.01); *B60W 2510/083* (2013.01); *B60W 2520/40* (2013.01); *B60W 2710/22* (2013.01); *B60W 2720/14* (2013.01)

(58) Field of Classification Search
CPC .... B60W 30/045; B60W 10/08; B60W 10/20; B60W 10/22; B60W 2510/083; B60W 2520/40; B60W 2710/22; B60W 2720/14; B60W 2520/14; B60W 2520/125; B60W 2520/10; B60W 2540/18; B60W 2710/083; B60W 2710/226
See application file for complete search history.

(56) References Cited

U.S. PATENT DOCUMENTS

| | | | | |
|---|---|---|---|---|
| 10,259,432 B1* | 4/2019 | Meier | ....................... | B60S 9/04 |
| 2004/0267429 A1* | 12/2004 | Matsuno | ............... | B60W 40/09 |
| | | | | 701/72 |
| 2008/0082234 A1* | 4/2008 | Majersik | ............ | B60G 17/0162 |
| | | | | 701/37 |

* cited by examiner

Primary Examiner — Tyler J Lee
Assistant Examiner — Yufeng Zhang
(74) Attorney, Agent, or Firm — Morgan, Lewis & Bockius LLP

(57) ABSTRACT

A device and a method for improving a turning motion of a vehicle may improve turning stability by cooperative control of an electric motor and the electronic controlled suspension (ECS) and improve behavior stability by optimizing a pitch/roll behavior by allowing realization of a target yaw moment required to improve turning characteristic of the vehicle to be reinforced by not only a yaw moment directly generated by a braking torque or a driving torque of the electric motor, but also a yaw moment indirectly generated by a load movement caused by controlling a damping force of the electronic controlled suspension (ECS).

19 Claims, 23 Drawing Sheets

DEVICE AND METHOD FOR IMPROVING TURNING MOTION OF VEHICLE

CROSS-REFERENCE TO RELATED APPLICATION

The present application claims priority to Korean Patent Application No. 10-2020-0119777, filed on Sep. 17, 2020, the entire contents of which is incorporated herein for all purposes by this reference.

BACKGROUND OF THE INVENTION

Field of the Invention

The present invention relates to a device and a method for improving a motion performance of a vehicle that performs a turning motion.

Description of Related Art

In an electric vehicle traveling by a driving force of an electric motor, it is general to increase a travel distance by maximizing efficiencies of the motor and an inverter for each travel situation by appropriately allocating the driving force to a front wheel motor and a rear wheel motor.

However, in a conventional electric vehicle, control amounts of the front wheel motor and the rear wheel motor are determined in a state in which a handling situation caused by manipulation of a steering device by a driver or autonomous driving, that is, a situation at a time of turning motion is not sufficiently considered, so that there was a problem that a turning responsibility during the vehicle travel is not very good.

Thus, there was a problem in not being able to properly cope with an oversteer (OS) phenomenon in which a turning radius becomes smaller as a vehicle body turns too much during a turning motion, which is cornering of the vehicle, or an understeer (US) phenomenon in which the turning radius becomes larger as the vehicle deviates outwardly from a target line intended during the handling by the vehicle.

Furthermore, the vehicle is provided with an electronic controlled suspension (ECS), so that the vehicle may improve riding comfort during the travel by appropriately performing damping control based on an input of a road surface experienced by the vehicle during the travel or a vehicle speed.

However, the electronic controlled suspension (ECS) provided in the conventional electric vehicle has a problem of not properly contributing to optimization of a turning performance as the damping control biased toward improving the ride comfort is made irrespective of control of the front wheel motor and the rear wheel motor.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a device and a method for improving a turning motion of a vehicle which may improve turning stability by cooperative control of an electric motor and the electronic controlled suspension (ECS) and improve behavior stability by optimizing a pitch/roll behavior by allowing realization of a target yaw moment required to improve turning characteristic of the vehicle to be reinforced by not only a yaw moment directly generated by a braking torque or a driving torque of the electric motor, but also a yaw moment indirectly generated by a load movement caused by controlling a damping force of the electronic controlled suspension (ECS).

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a device configured for improving a turning motion of a vehicle includes a turning characteristic determination module that determines whether a turning characteristic of the vehicle is an understeer (US) state or an oversteer (OS) state according to information for identifying a travel situation of the vehicle, a turning characteristic improvement module that determines a target yaw moment required to improve the turning characteristic of the vehicle and determines a motor control amount for realizing the determined target yaw moment to control whether to brake or drive an electric motor, and a cooperative control module that controls a damping force of an electronic controlled suspension (ECS) to cause a load movement of the vehicle configured for contributing to the realization of the target yaw moment.

In various exemplary embodiments of the present invention, the turning characteristic improvement module may include a US improvement controller that is configured to control a braking torque to be generated from the electric motor of the vehicle to realize the target yaw moment required for improving the turning characteristic when the turning characteristic is the understeer (US) state, and an OS improvement controller that is configured to control a driving torque to be generated from the electric motor of the vehicle to realize the target yaw moment required for improving the turning characteristic when the turning characteristic is the oversteer (OS) state.

In various exemplary embodiments of the present invention, the turning characteristic improvement module may further include a target yaw moment determining device that determines the target yaw moment to be realized in the vehicle in the turning motion to improve the turning characteristic of the vehicle, and a motor control amount determining device that determines the motor control amount to be applied to the electric motor to generate a motor torque required to realize the target yaw moment.

In various exemplary embodiments of the present invention, the target yaw moment determining device may determine the target yaw moment required to improve the turning characteristic of the vehicle based on a bicycle model.

In various exemplary embodiments of the present invention, the target yaw moment determining device may determine the target yaw moment by defining a sliding surface defined using sliding mode control (SMC) as a yaw rate error plane based on a bicycle model.

In various exemplary embodiments of the present invention, the cooperative control module may include a turning stabilization cooperative controller that is configured to control the damping force of the electronic controlled suspension (ECS) to contribute to the realization of the target yaw moment for improving the turning characteristic by increasing the load movement toward a front wheel or a rear wheel of the vehicle in the turning motion.

In various exemplary embodiments of the present invention, the turning stabilization cooperative controller may perform control to weaken a damping force of an electronic controlled suspension (ECS) on a front wheel side to be in a soft state and strengthen a damping force of an electronic controlled suspension (ECS) on a rear wheel side to be in a hard state when the turning characteristic of the vehicle is the understeer (US) state.

In various exemplary embodiments of the present invention, the turning stabilization cooperative controller may perform control to strengthen a damping force of an electronic controlled suspension (ECS) on a front wheel side to be in a hard state and weaken a damping force of an electronic controlled suspension (ECS) on a rear wheel side to be in a soft state when the turning characteristic of the vehicle is the oversteer (OS) state.

In various exemplary embodiments of the present invention, the cooperative control module may include a behavior stabilization cooperative controller that additionally controls the electric motor and the electronic controlled suspension (ECS) to stabilize a pitch/roll behavior of the vehicle, wherein the pitch/roll behavior is incidental to a braking torque or a driving torque generated by the electric motor to improve the turning characteristic.

In various exemplary embodiments of the present invention, the behavior stabilization cooperative controller may perform control not only to additionally generate the driving torque to a driving motor, but also to strengthen a damping force of an electronic controlled suspension (ECS) on a front wheel side to be in a hard state and weaken a damping force of an electronic controlled suspension (ECS) on a rear wheel side to be in a soft state when the turning characteristic is the understeer (US) state in a four wheel drive (4WD) vehicle provided with two or more electric motors.

In various exemplary embodiments of the present invention, the behavior stabilization cooperative controller may perform control not only to additionally generate the braking torque to a braking motor, but also to strengthen a damping force of an electronic controlled suspension (ECS) on a rear wheel side to be in a hard state and weaken a damping force of an electronic controlled suspension (ECS) on a front wheel side to be in a soft state when the turning characteristic is the oversteer (OS) state in a four wheel drive (4WD) vehicle provided with two or more electric motors.

According to various aspects of the present invention, a method for improving a turning motion of a vehicle includes a turning characteristic determination operation of determining whether a turning characteristic of the vehicle is an understeer (US) state or an oversteer (OS) state according to information for identifying a travel situation of the vehicle, a turning characteristic improvement operation of determining a target yaw moment required to improve the turning characteristic of the vehicle and controlling whether to brake or drive an electric motor to realize the determined target yaw moment, and a cooperative control operation of controlling a damping force of an electronic controlled suspension (ECS) to cause a load movement of the vehicle configured for contributing to the realization of the target yaw moment.

In various exemplary embodiments of the present invention, the turning characteristic improvement operation may include a US improving mode execution process for controlling a braking torque to be generated from the electric motor of the vehicle to realize the target yaw moment required for improving the turning characteristic when the turning characteristic is the understeer (US) state, and an OS improving mode execution process for controlling a driving torque to be generated from the electric motor of the vehicle to realize the target yaw moment required for improving the turning characteristic when the turning characteristic is the oversteer (OS) state.

In various exemplary embodiments of the present invention, the turning characteristic improvement operation may include a target yaw moment calculation process for determining the target yaw moment to be realized in the vehicle in the turning motion to improve the turning characteristic of the vehicle, and a motor control amount determination process for determining a motor control amount to be applied to the electric motor to generate a motor torque required to realize the target yaw moment.

In various exemplary embodiments of the present invention, the cooperative control operation may include a turning stabilization cooperative control process for controlling the damping force of the electronic controlled suspension (ECS) to contribute to the realization of the target yaw moment for improving the turning characteristic by increasing the load movement toward a front wheel or a rear wheel of the vehicle in the turning motion.

In various exemplary embodiments of the present invention, the turning stabilization cooperative control process may include performing control to weaken a damping force of an electronic controlled suspension (ECS) on a front wheel side to be in a soft state and strengthen a damping force of an electronic controlled suspension (ECS) on a rear wheel side to be in a hard state when the turning characteristic of the vehicle is the understeer (US) state.

In various exemplary embodiments of the present invention, the turning stabilization cooperative control process may include performing control to strengthen a damping force of an electronic controlled suspension (ECS) on a front wheel side to be in a hard state and weaken a damping force of an electronic controlled suspension (ECS) on a rear wheel side to be in a soft state when the turning characteristic of the vehicle is the oversteer (OS) state.

In various exemplary embodiments of the present invention, the cooperative control operation may include a behavior stabilization cooperative control process for additionally controlling the electric motor and the electronic controlled suspension (ECS) to stabilize a pitch/roll behavior of the vehicle, wherein the pitch/roll behavior is incidental to a braking torque or a driving torque generated by the electric motor to improve the turning characteristic.

In various exemplary embodiments of the present invention, the behavior stabilization cooperative control process may include performing control not only to additionally generate the driving torque to a driving motor, but also to strengthen a damping force of an electronic controlled suspension (ECS) on a front wheel side to be in a hard state and weaken a damping force of an electronic controlled suspension (ECS) on a rear wheel side to be in a soft state when the turning characteristic is the understeer (US) state in a four wheel drive (4WD) vehicle provided with two or more electric motors.

In various exemplary embodiments of the present invention, the behavior stabilization cooperative control process may include performing control not only to additionally generate the braking torque to a braking motor, but also to strengthen a damping force of an electronic controlled suspension (ECS) on a rear wheel side to be in a hard state and weaken a damping force of an electronic controlled suspension (ECS) on a front wheel side to be in a soft state when the turning characteristic is the oversteer (OS) state in a four wheel drive (4WD) vehicle provided with two or more electric motors.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
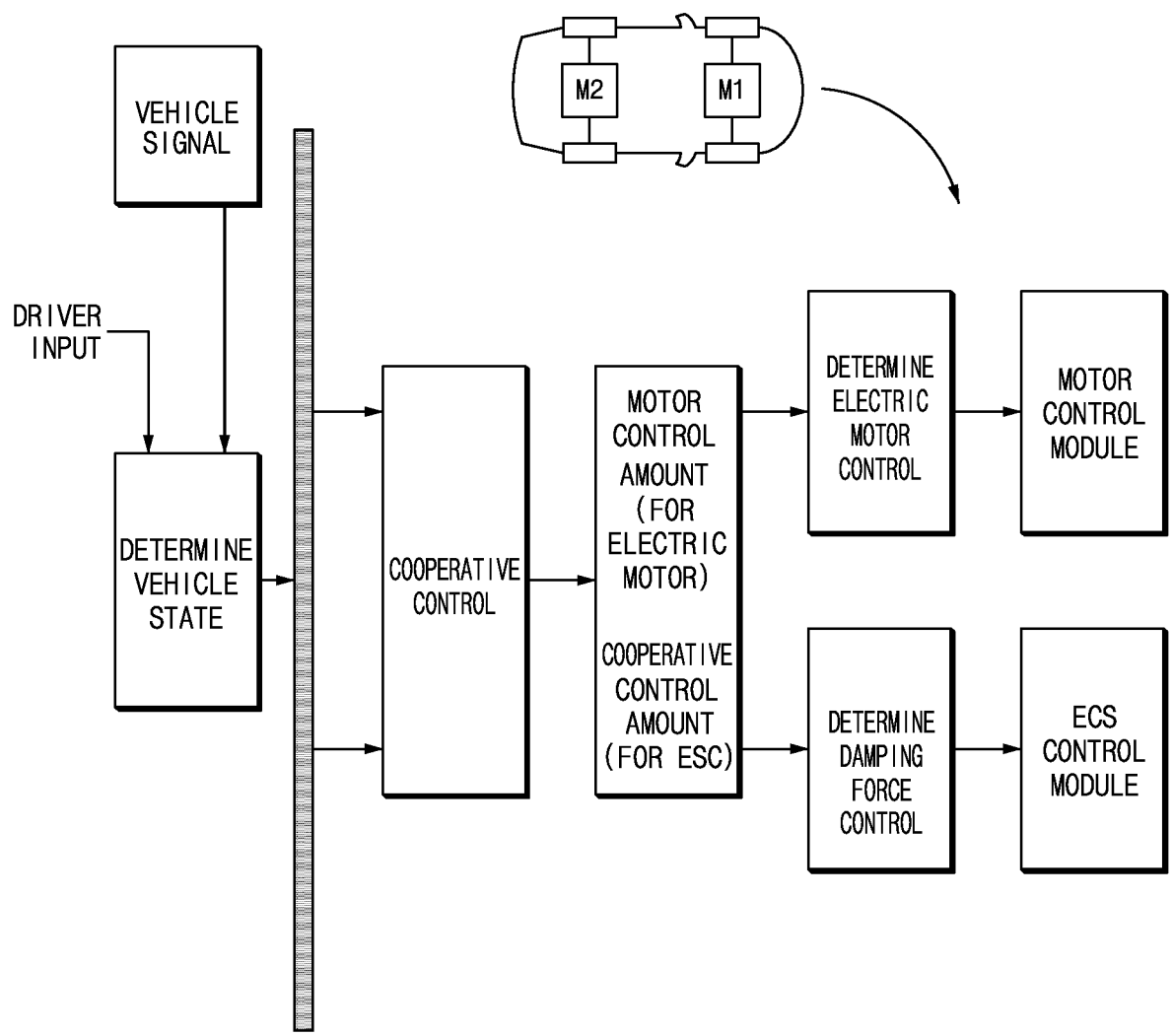
FIG. 1 is an overall schematic diagram of a device configured for improving a turning motion of a vehicle according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, embodiments of the present invention will be described in detail with reference to FIGS. 1 to 18.

Figure 2:
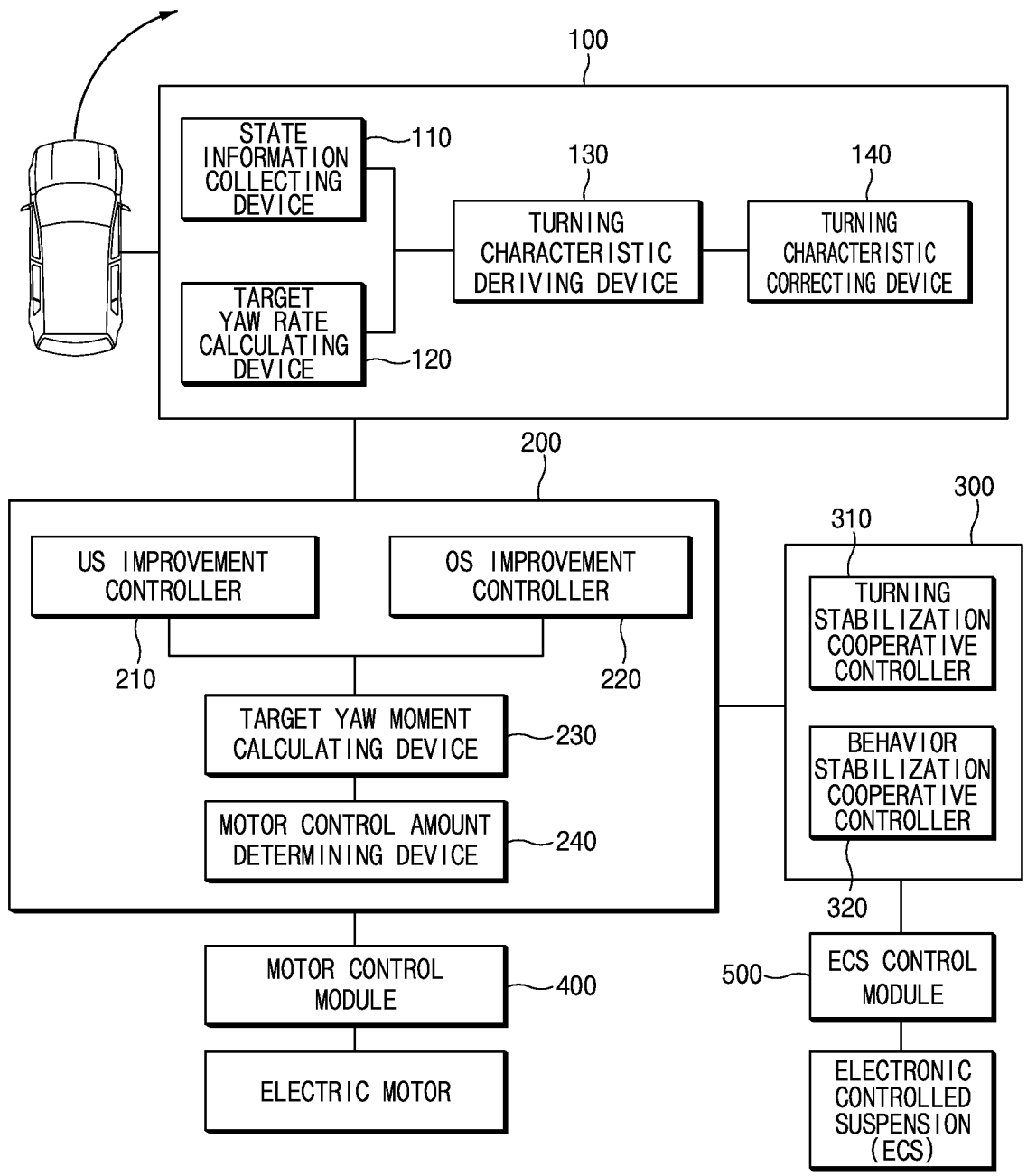
FIG. 2 is a detailed block diagram of a device configured for improving a turning motion of a vehicle according to various exemplary embodiments of the present invention.

FIG. 1 is an overall schematic diagram of a device configured for improving a turning motion of a vehicle according to various exemplary embodiments of the present invention, and FIG. 2 is a detailed block diagram of a device configured for improving a turning motion of a vehicle according to various exemplary embodiments of the present invention.

Referring to FIG. 1 and FIG. 2, a device configured for improving a turning motion of a vehicle according to various exemplary embodiments of the present invention may include a turning characteristic determination module 100 that determines whether turning characteristic of the vehicle is an understeer (US) state or an oversteer (OS) state according to information for identifying a travel situation of the vehicle, a turning characteristic improvement module 200 that determines a target yaw moment required to improve the turning characteristic of the vehicle and controls whether to brake or drive an electric motor to realize the determined target yaw moment, and a cooperative control module 300 that controls a damping force of an electronic controlled suspension (ECS) to cause a load movement of the vehicle which may contribute to the realization of the target yaw moment.

Furthermore, the present invention may include the motor control module 400 that performs braking or driving control by applying a motor control amount determined by the turning characteristic improvement module to the electric motor, and an ECS control module 500 that controls the damping force by applying a cooperative control amount determined by the cooperative control module to the electronic controlled suspension (ECS).

In various exemplary embodiments of the present invention, as shown in FIG. 1, after identifying the turning characteristic of the vehicle by determining a vehicle state by input information (indicated as a 'driver input' in FIG. 1) controlled by a driver or autonomous driving means and various information (indicated as a 'vehicle signal' in FIG. 1) acquired from the vehicle in travel, a control amount for realizing the target yaw moment required to improve such a turning characteristic may be determined.

In the present connection, the present invention allows the realization of the target yaw moment required to improve the turning characteristic of the vehicle to be reinforced by not only a yaw moment directly generated by a braking torque or a driving torque of the electric motor, but also a yaw moment indirectly generated by a load movement caused by controlling the damping force of the electronic controlled suspension (ECS), improving the turning characteristic by cooperative control of the electric motor and the electronic controlled suspension (ECS).

To this end, in various exemplary embodiments of the present invention, in improving the turning characteristic of the vehicle, the motor control amount for performing the braking or driving control of the electric motor and the cooperative control amount for controlling the damping force of the electronic controlled suspension (ECS) are determined, and then, the motor control amount and the cooperative control amount are transmitted to the motor control module 400 and the ECS control module 500, respectively, so that the cooperative control of the electric motor and the electronic controlled suspension (ECS) may be performed.

As the turning characteristic is improved by the cooperative control of the electric motor and the electronic controlled suspension (ECS), the yaw moment may be realized to a degree beyond a limit of the braking torque or the driving torque generated by the electric motor, improving agility and the turning stability of the vehicle during the turning motion. Furthermore, excessive braking torque or driving torque may be prevented from being applied to the electric motor to realize the target yaw rate for improving the turning characteristic, so that travel stability may be improved by minimizing a sense of heterogeneity that a driver feels during the turning motion.

The turning characteristic determination module 100 may determine the turning characteristic of the traveling vehicle based on information obtained from various sensors provided on the vehicle, that is, whether the vehicle in the turning motion during cornering is in the understeer (US) state or the oversteer (OS) state.

To this end, the turning characteristic determination module 100 may include a state information collecting device 110 that obtains at least one of various information allowing a turning motion situation of the vehicle to be identified, including a vehicle speed, a steering angle, a lateral jerk, a yaw rate, and a lateral slip angle of the vehicle, through reception directly from the various sensors provided on the vehicle or through estimation based on the received information, a target yaw rate determining device 120 that determines the target yaw rate intended for the turning motion of the traveling vehicle based on information related to at least one of the vehicle speed and/or the steering angle, and a turning characteristic deriving device 130 that determines whether the turning characteristic of the vehicle is the understeer (US) state or the oversteer (OS) state using a yaw rate error amount and a magnitude difference between a lateral slip angle of a front wheel and a lateral slip angle of a rear wheel after determining a difference between the determined target yaw rate and a current yaw rate of the vehicle to determine the yaw rate error amount.

In the present connection, the state information collecting device 110 may obtain the various information such as the steering angle, the yaw rate, or the like required for an operation for determining the target yaw moment by the turning characteristic improvement module and determining the motor control amount using the same.

The state information collecting device 110 may obtain various information for identifying the state of the vehicle, such as estimating the lateral slip angles of the front wheel and the rear wheel or estimating lateral acceleration or the lateral jerk based on the information obtained from the various sensors, or various information required to determine the control amount to be applied to the electric motor to improve the turning characteristic.

Furthermore, the target yaw rate calculating device 120 may determine the target yaw rate intended for the turning motion based on the at least one of the vehicle speed and/or the steering angle obtained from the state information collecting device 110, and utilize the determined target yaw rate as data for determining the turning characteristic.

Various vehicle dynamics models may be applied in performing the estimation or the operation to obtain the data for determining the turning characteristic of the vehicle in the state information collecting device 110 and the target yaw rate calculating device 120.

Figure 3:
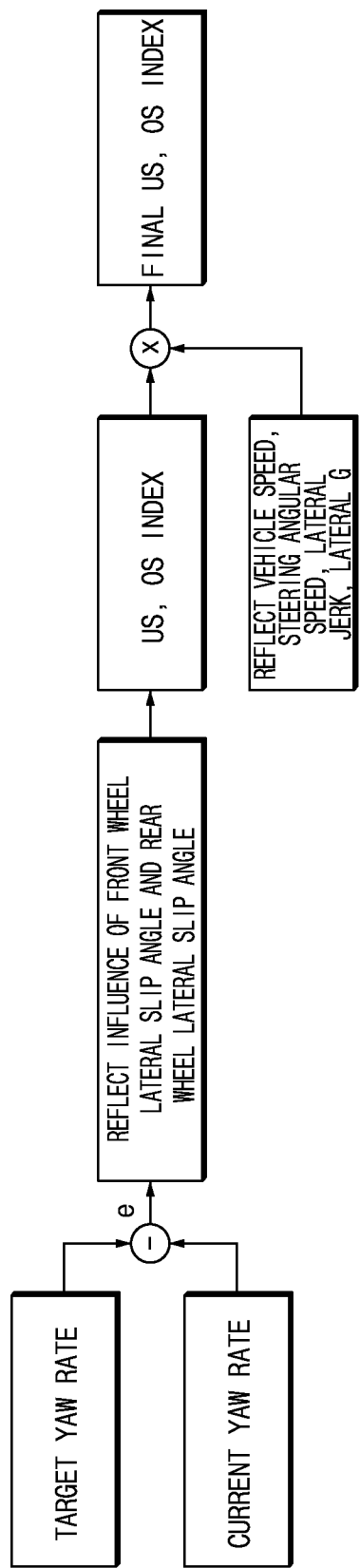
FIG. 3 is a conceptual diagram illustrating derivation of US and OS indices by determining a vehicle state according to various exemplary embodiments of the present invention.

Furthermore, as shown in FIG. 3, the turning characteristic deriving device 130 may determine the difference between the target yaw rate and the current yaw rate obtained from the state information collecting device to determine a yaw rate error amount "e", and then, reflect a result of comparing magnitudes of the front wheel lateral slip angle with the rear wheel lateral slip angle to the determined yaw rate error amount "e" to determine the turning characteristic of the vehicle.

Accordingly, the turning characteristic deriving device 130 may determine that the turning characteristic of the vehicle is the understeer (US) state when the front wheel lateral slip angle is greater than the rear wheel lateral slip angle, and determine that the turning characteristic of the vehicle is the oversteer (OS) state when the rear wheel lateral slip angle is greater than the front wheel lateral slip angle. Furthermore, the determined understeer or oversteer state may be determined as severe when the yaw rate error amount "e" is greater than a certain threshold, and the determined understeer or oversteer state may be determined as normal when the yaw rate error amount "e" is less than the certain threshold, and the determination result may be derived as a turning characteristic index (indicated as 'US, OS INDEX' in FIG. 3).

Furthermore, the turning characteristic determination module 100 may further include a turning characteristic correcting device 140 that corrects the turning characteristic index by reflecting at least one of the vehicle speed, the lateral acceleration, and/or the lateral jerk obtained by the state information collecting device to determine a final turning characteristic index (indicated as 'final US, OS INDEX' in FIG. 3).

As such, the information such as the vehicle speed, the lateral acceleration, and the lateral jerk reflected to correct the turning characteristic index in the turning characteristic correcting device 140 is a weight factor for reflecting a turning will of the driver in the deriving of the turning characteristic. Based on the reflection result, the state of the turning characteristic index determined from the turning characteristic deriving device may be changed from the severe to the normal or from the normal to the severe.

That is, the turning characteristic may be corrected to the severe when the vehicle speed is high rather than low. Furthermore, even when the lateral acceleration or the lateral jerk is large, as on a low friction road surface, the turning characteristic may be corrected to the severe to determine the final turning characteristic index.

Hereinafter, the final turning characteristic index determined from the turning characteristic correcting device is simply referred to as the turning characteristic index, and a turning characteristic of each vehicle in which control for improving the turning motion is performed is referred to as the understeer state US INDEX or the oversteer state OS INDEX. Such expression is applied to the drawings.

Furthermore, the turning characteristic improvement module 200 may include a US improvement controller 210 that controls the braking torque to be generated from the electric motor of the vehicle to realize the target yaw moment required for improving the turning characteristic when the turning characteristic is the understeer (US) state, and an OS improvement controller 220 that controls the driving torque to be generated from the electric motor of the vehicle to realize the target yaw moment required for improving the turning characteristic when the turning characteristic is the oversteer (OS) state.

Furthermore, the turning characteristic improvement module 200 may further include a target yaw moment calculating device 230 that determines the target yaw moment to be realized in the vehicle in the turning motion to improve the turning characteristic of the vehicle, and a motor control amount determining device 240 that determines the motor control amount to be applied to the electric motor to generate a motor torque required to realize the target yaw moment.

Figure 4A:
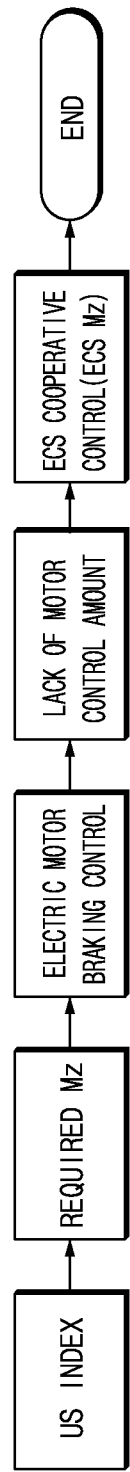
FIG. 4A and FIG. 4B are conceptual diagrams illustrating that cooperative control modes based on a vehicle state is determined according to various exemplary embodiments of the present invention.

Accordingly, as shown in FIG. 4A, the US improvement controller 210 may apply a control signal Motor_Mz that generates the braking torque to the electric motor to perform the braking control, improving the understeer (US) state by a yaw moment caused by increase in a grip force with respect to the ground in the front wheel.

Figure 4B:
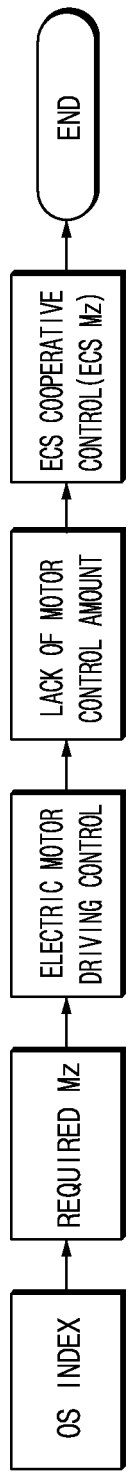

Furthermore, as shown in FIG. 4B, the OS improvement controller 220 may apply the control signal Motor_Mz that generates the driving torque to the electric motor to perform the driving control, improving the oversteer (OS) state by a yaw moment caused by increase in the grip force with respect to the ground in the rear wheel.

To this end, as braking and driving are performed by one electric motor in a case of a 2WD (Two Wheel Drive) vehicle having only a single electric motor "M", the US improvement controller 210 may apply the motor control amount determined by the motor control amount determining device as a control signal for the single electric motor by the motor control module to generate the braking torque, realizing the target yaw moment.

Figure 5:
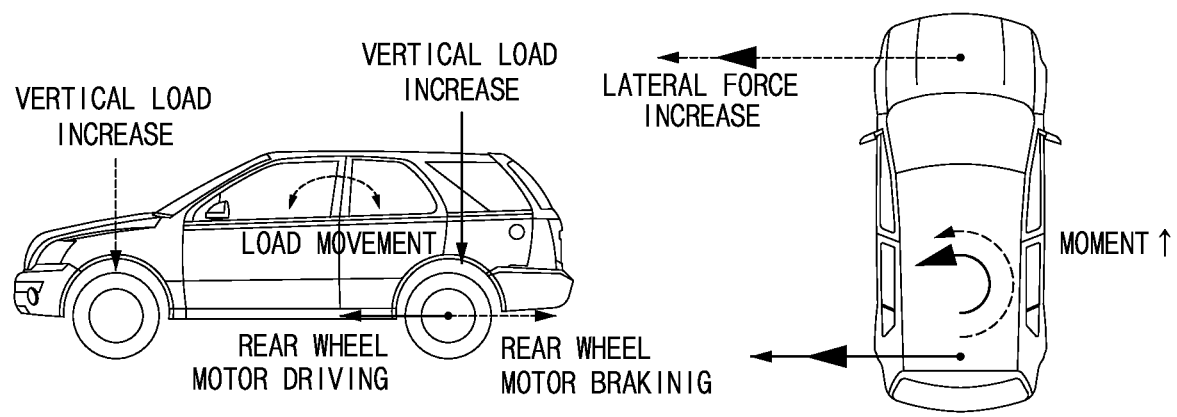
FIG. 5 is an exemplary view exemplarily illustrating that control for improving a turning motion is performed using a single electric motor in a 2WD electric vehicle according to various exemplary embodiments of the present invention.

It is indicated in (a) of FIG. 5 that the braking torque (indicated by a dotted arrow toward a rear of the vehicle) is generated from a rear wheel motor, which is the single electric motor provided in the 2WD vehicle, so that the load movement toward the front wheel of the vehicle is induced to increase a vertical load (indicated by a dotted arrow) at a front wheel side, improving a front wheel grip force. Furthermore, in (b) of FIG. 5, increase in the moment in a turning direction to improve the understeer characteristics is indicated by indicating a moment generated by the braking torque additionally generated by the motor control amount by a dotted arrow (a dotted arrow rotating in the counter-clockwise direction) while indicating a moment already generated in a turning direction by the turning motion of the vehicle by a thick arrow (an arrow rotating in the counter-clockwise direction).

Furthermore, as the braking and the driving are respectively performed in the electric motors in a case of a 4WD (Four Wheel Drive) vehicle having two or more electric motors M1 and M2, the US improvement controller 210 may apply the motor control amount determined by the motor control amount determining device as a control signal for a braking motor in charge of the braking (in various exemplary embodiments of the present invention, the rear wheel motor is referred to as the electric motor in charge of the braking) by the motor control module to generate the braking torque, realizing the target yaw moment.

Figure 6:
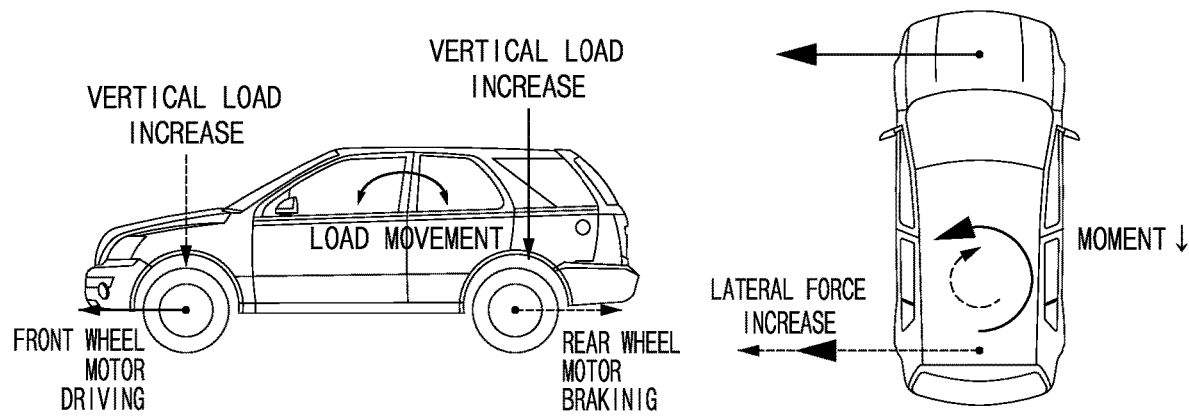
FIG. 6 is an exemplary view exemplarily illustrating that control for improving a turning motion is performed using each of a front wheel motor and a rear wheel motor in a 4WD electric vehicle according to various exemplary embodiments of the present invention.

As in the case of FIG. 5, it is indicated by a dotted arrow in (a) of FIG. 6 that the braking torque (indicated by a dotted arrow toward the rear of the vehicle) is generated from the rear wheel motor provided in the 4WD vehicle, so that the load movement toward the front wheel of the vehicle is induced to increase the vertical load at the front wheel side, improving the front wheel grip force.

Furthermore, in the case of the 2WD vehicle, the OS improvement controller 220 may realize the target yaw moment by generating the driving torque by applying the motor control amount determined by the motor control amount determining device as the control signal for the single electric motor by the motor control module to generate the driving torque.

It is indicated in (a) of FIG. 5 that the driving torque (indicated by a solid arrow toward a front of the vehicle) is generated from the rear wheel motor, which is the single electric motor provided in the 2WD vehicle, so that the load movement toward the rear wheel of the vehicle is induced to increase a vertical load (indicated by a solid arrow) at a rear wheel side, improving a rear wheel grip force. Furthermore, in (b) of FIG. 5, increase in the moment to improve an oversteer characteristic may be identified by indicating the moment generated by the driving torque additionally generated by the motor control amount by a solid arrow.

Furthermore, in the case of the 4WD (Four Wheel Drive) vehicle, the OS improvement controller 220 may realize the target yaw moment by generating the driving torque by applying the motor control amount determined by the motor control amount determining device as the control signal for the driving motor in charge of the driving (in various exemplary embodiments of the present invention, the front wheel motor is referred to as the electric motor in charge of the driving) by the motor control module to generate the driving torque.

As in the case of FIG. 5, it is also indicated by a dotted arrow in (a) of FIG. 6 that the driving torque (indicated by a solid arrow toward the front of the vehicle) is generated from the front wheel motor provided in the 4WD vehicle, so that the load movement toward the rear wheel of the vehicle is induced to increase the vertical load at the rear wheel side (indicated by a solid arrow), improving the rear wheel grip force.

As such, the yaw moment generated from the OS improvement controller is directed in a direction (i.e., a dotted arrow directed in a clockwise direction) opposite to a current yaw moment (indicated by an arrow rotating in the counterclockwise direction) of the vehicle in the turning motion as shown in (b) of FIG. 6, so that it may be seen that the yaw moment of the vehicle in the turning motion is reduced to improve the oversteer characteristic.

Furthermore, the target yaw moment calculating device 230 may determine a value of the target yaw moment which may be additionally generated in the vehicle in the turning motion to improve the turning characteristic of the vehicle in the understeer (US) or oversteer (OS) state to be close to a neutral steer state.

The target yaw moment calculating device 230 may determine a target yaw moment $M_z$ using a slip angle $\beta$ and a yaw angle $\gamma$ of the vehicle and a front wheel steering angle $\delta_f$ and a rear wheel steering angle $\delta_r$ of the vehicle based on a bicycle model as shown in Mathematical Equation 1 below.

[Mathematical Equation 1]

$$\begin{bmatrix} \dot{\beta} \\ \dot{\gamma} \end{bmatrix} = \begin{bmatrix} \frac{-(C_f + C_r)}{mV_x} & \frac{(-l_f C_f + l_r C_r)}{mV_x^2} \\ \frac{(-l_f C_f + l_r C_r)}{I_z} & \frac{-(l_f^2 C_f + l_r^2 C_r)}{I_z V_x} \end{bmatrix} \begin{bmatrix} \beta \\ \gamma \end{bmatrix} +$$

-continued $$\begin{bmatrix} \frac{C_f}{mV_x} & \frac{C_r}{mV_x} \\ \frac{l_f C_f}{I_z} & -\frac{l_r C_r}{I_z} \end{bmatrix} \begin{bmatrix} \delta_f \\ \delta_r \end{bmatrix} + \begin{bmatrix} 0 & \frac{1}{mV_x} \\ \frac{1}{I_z} & 0 \end{bmatrix} \begin{bmatrix} F_y \\ M_z \end{bmatrix}$$

In the Mathematical Equation 1, a slip rate $\dot{\beta}$ and a yaw rate $\dot{\gamma}$ are expressed as a relational expression of the slip angle $\beta$ and the yaw angle $\gamma$, the front wheel steering angle $\delta_f$ and the rear wheel steering angle $\delta_r$ of the vehicle, a tire lateral force $F_y$, and the yaw moment $M_z$. The present relational expression may be determined to express the yaw rate $\dot{\gamma}$ as a relational expression of the yaw moment M as shown in Mathematical Equation 2 below.

[Mathematical Equation 2]

$$\dot{\gamma} = \frac{-(l_f^2 C_f + l_r^2 C_r)}{I_z V_x}\gamma + \frac{(-l_f C_f + l_r C_r)}{I_z}\beta + \frac{l_f C_f}{I_z}\delta_f - \frac{l_r C_r}{I_z}\delta_r + \frac{1}{I_z}M_z$$

In the present connection, in Mathematical Equation 1 and Mathematical Equation 2, $l_f$ and $l_r$ respectively mean distances from a center of mass of the bicycle model to centers of the front wheel and the rear wheel, and $C_f$ and $C_r$ represent cornering stiffnesses. Furthermore, $V_x$ represents the speed of the vehicle, and $I_z$ represents a moment of inertia. In the instant case, the cornering stiffnesses $C_f$ and $C_r$ may determine the target yaw moment by applying tuned values (tuned $C_f$ and $C_r$) based on the slip angle to be used in both a normal travel region and a limit region.

Furthermore, the target yaw moment calculating device 230 may first determine a current yaw moment control amount implemented in the vehicle according to signals such as the current yaw rate obtained by the turning characteristic determination module, determine a final yaw moment control amount required to perform a desired turning motion based on the target yaw rate determined by the turning characteristic determination module, and then, determine a difference between the final yaw moment control amount and the current yaw moment control amount as the target yaw moment $M_z$ required for improving the turning characteristic. Accordingly, a target yaw moment configured for reducing the yaw rate error amount determined by the turning characteristic determination module may be determined.

In the present connection, as in Mathematical Equation 3 and Mathematical Equation 4 below, the target yaw moment calculating device 230 may determine the target yaw rate by defining a sliding surface defined using sliding mode control (SMC) as a yaw rate error plane based on the bicycle model. Mathematical Equation 3 below represents conditions defining the sliding surface, and Mathematical Equation 4 below represents the target yaw rate $M_z$ determined by such sliding mode control SMC.

[Mathematical Equation 3]

$$|C_i - \hat{C}_i| \le F_i, (i = f, r)s = \gamma - \gamma_d \dot{S}_1 = \dot{\gamma} - \dot{\gamma}_d$$

[Mathematical Equation 4]

$$M_z = \frac{(l_f^2 \hat{C}_f + l_r^2 \hat{C}_r)}{V_x}\gamma - (l_f \hat{C}_f + l_r \hat{C}_r)\beta -$$

$$l_f \hat{C}_f \delta_f + l_r \hat{C}_r \delta_r + I_Z \dot{\gamma}_d - k_1 \cdot sat\left(\frac{S_1}{\Phi}\right)$$

$$k_1 \geq \left|\frac{l_f^2 F_f + l_r^2 F_r}{V_x}\right| |\gamma| + |l_f F_f - l_r F_r||\beta| + |l_f F_f||\delta_f| + |l_r F_r||\delta_r| + I_Z \eta_1 \quad 5$$

It has been referred to as an example that the target yaw moment calculating device 230 according to the embodiment determines the target yaw moment using the sliding mode control (SMC) based on the bicycle model, but the present invention is not limited thereto. The target yaw moment may be determined using various vehicle dynamics models and control methods.

Furthermore, the motor control amount determining device 240 may determine the motor control amount to be applied to the electric motor to realize the target yaw moment based on a tire force determined from a vehicle model.

Figure 7A:
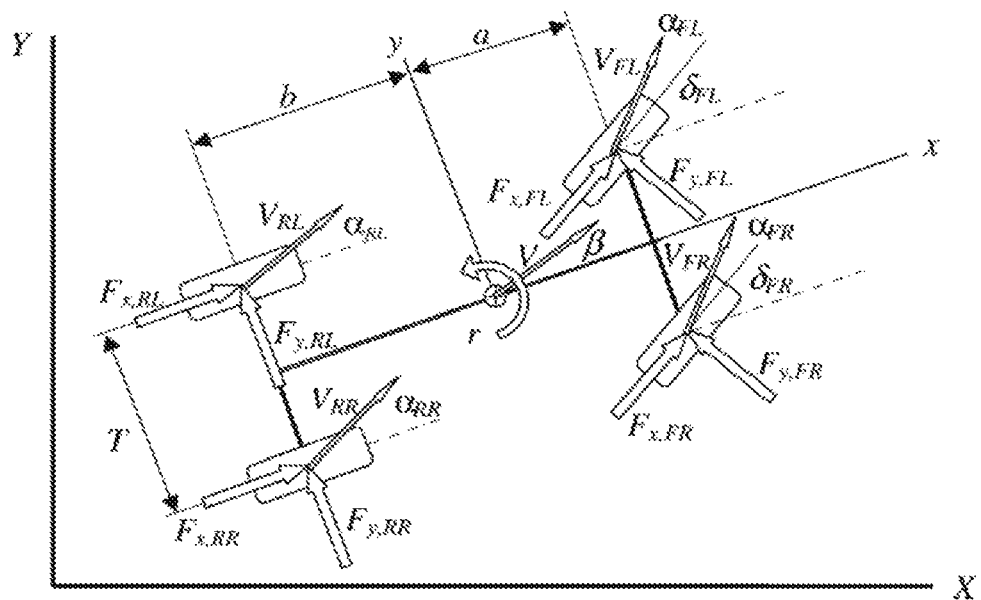
FIG. 7A and FIG. 7B are exemplary views of a vehicle dynamics model illustrating a force acting on a tire according to various exemplary embodiments of the present invention.
Figure 7B:
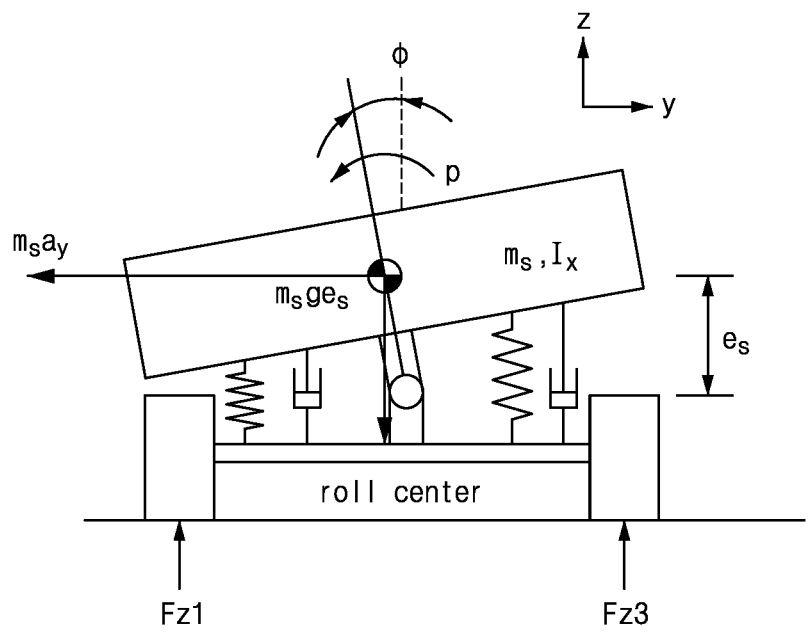

To this end, as in Mathematical Equation 5 below, the motor control amount determining device 240 may represent the target yaw moment $M_z$ to be realized at a center of mass of the vehicle as a relational expression of a force acting on each tire on a vehicle dynamics model as shown in FIG. 7A and FIG. 7B. In the present connection, FIG. 7A shows a vehicle dynamics model with 8 degrees of freedom, and FIG. 7B shows a dynamics model of a vertical load acting on the vehicle during the turning motion. In Mathematical Equation 5, "a" means a distance from the center of mass of the vehicle to a front wheel axis of the vehicle, "b" means a distance from the center of mass of the vehicle to a rear wheel axis, and "T" means an overall width of the vehicle.

[Mathematical Equation 5]

$$M_z = a(F_{yfl} + F_{yfr}) - b(F_{yrl}, + F_{yrr},) + \frac{T}{2}[(F_{xfl} + F_{xfl}) - (F_{xfr} + F_{xrr})]$$

Figure 8:
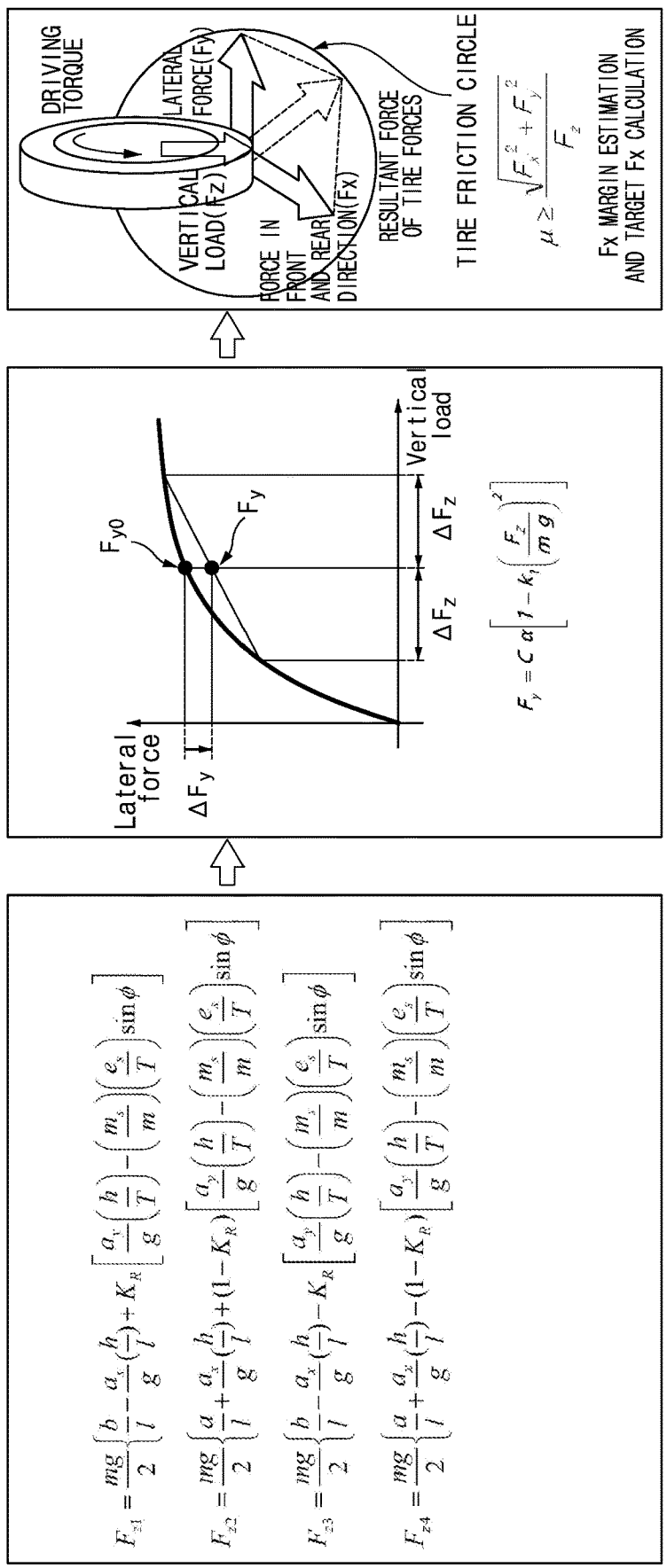
FIG. 8 is an exemplary view exemplarily illustrating that a tire driving force $F_x$ is determined according to various exemplary embodiments of the present invention.

Furthermore, the motor control amount determining device 240 may first determine a tire vertical load $F_z$ which may act on each tire of the vehicle to realize the yaw moment $M_z$ using a relational expression shown in (a) of FIG. 8, and then, determine the tire lateral force $F_y$ which may act on each tire by a graph and a relational expression representing a relationship between a vertical load and a lateral force shown in (b) of FIG. 8. Furthermore, a tire driving force $F_x$, which means a force in a front and rear direction of the tire may be determined based on a schematic diagram on a resultant force of the tire force shown in (c) of FIG. 8. In the present connection, $F_{z1}$, $F_{z2}$, $F_{z3}$, and $F_{z4}$ representing perpendicular loads of the tire mean vertical loads of respective tires of the vehicle, and $F_z$ represents an average of such vertical loads of the tires. This is the same in the case of the tire lateral force $F_y$ and the tire driving force $F_x$.

As such, to generate the target yaw moment which may be realized at the vehicle to improve the turning characteristic, the motor control amount determining device 240 may represent the target yaw moment as a sum of the lateral force $F_y$ acting on the tire and the driving force $F_x$, then, determine a braking torque or a driving torque $T_m$ which may be realized at the electric motor to follow the target yaw moment from a relational expression between the tire driving force $F_x$ and the vehicle speed V related to a vertical direction movement of the tire as shown in Mathematical Equation 6 below, and then, determine the braking torque or the driving torque $T_m$ as the motor control amount.

$$P = T_m \omega_m == F_x V \quad \text{[Mathematical Equation 6]}$$

That is, the motor control amount determining device 240 may determine the motor torque $T_m$ that includes the braking torque or the driving torque that should be realized at the electric motor from the relational expression of the tire driving force $F_x$ and the vehicle speed V and a relational expression of the motor torque $T_m$ and an angular speed $\omega_m$ that represent an output P of the electric motor as in Mathematical Equation 6, and determine the determined motor torque $T_m$ as the motor control amount.

Furthermore, the cooperative control module 300 may include a turning stabilization cooperative controller 310 that controls the damping force of the electronic controlled suspension (ECS) to contribute to the realization of the target yaw moment for improving the turning characteristic by increasing the load movement toward the front wheel or the rear wheel of the vehicle in the turning motion.

Such turning stabilization cooperative controller 310 may additionally increase a grip force of the tire on the ground by increasing the load movement toward the front wheel or the rear wheel by controlling the damping force of the electronic controlled suspension (ECS) such that the yaw moment caused by the braking torque or the driving torque to be realized by the electric motor based on the state of the turning characteristic may be reinforced.

As such, the yaw moment required for improving the turning characteristic by the turning stabilization cooperative controller 310 may not be realized only by control of the electric motor, but may be realized by mutual cooperative control with the electronic controlled suspension (ECS), so that an effect that exceeds a limit of the braking torque or the driving torque which may be generated at the electric motor may be realized.

That is, as shown in FIG. 4A and FIG. 4B, when the yaw moment realized by the braking force or the driving force generated by the control signal of the electric motor is insufficient because of the limit of the braking torque or the driving torque (which is expressed as 'lack of the motor control amount' in FIG. 4A and FIG. 4B), the turning stabilization cooperative controller 310 may be executed to compensate for a shortfall.

Furthermore, the turning stabilization cooperative controller 310 may also be executed to generate a portion of the yaw moment to be realized by the braking torque or the driving torque generated by the electric motor in an allotting manner without being limited in the case in which the yaw moment realized by the braking torque or the driving torque generated by the motor control amount applied to the electric motor is insufficient for the target yaw moment.

To this end, in realizing the target yaw moment required to improve the turning characteristic of the vehicle, the turning stabilization cooperative controller 310 may determine the cooperative control amount for controlling the damping force of the electronical controlled suspension (ECS) such that the yaw moment may be reinforced by increasing the grip force of the tire with respect to the ground on the front wheel side or the rear wheel side in addition to the yaw moment generated by the braking torque or driving torque generated by the electric motor.

Figure 9:
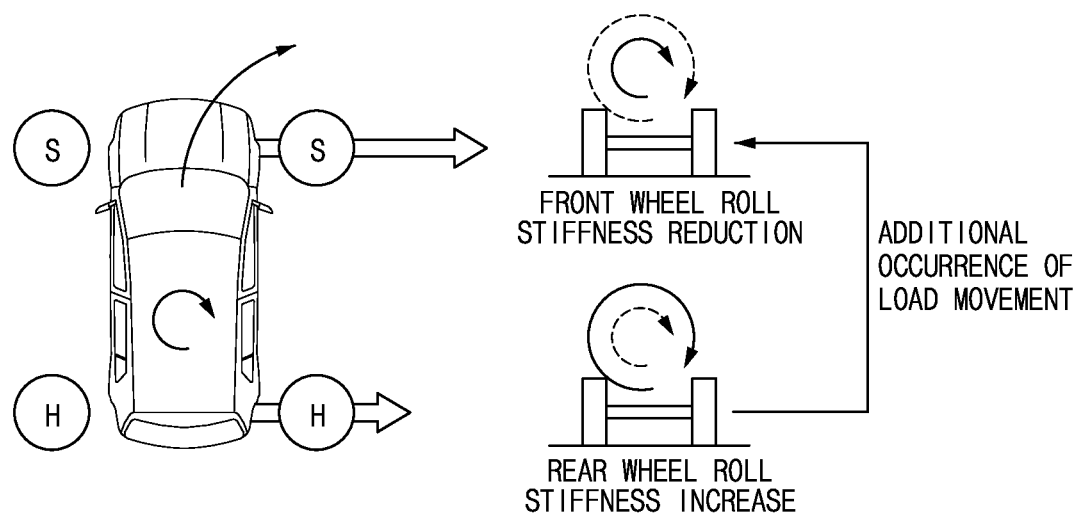
FIG. 9 is a schematic diagram illustrating improvement of an US phenomenon by control of an electric motor and ECS cooperative control according to various exemplary embodiments of the present invention.

Accordingly, the turning stabilization cooperative controller 310 may perform control to increase the grip force of the tire with respect to the ground on the front wheel side by increasing the load movement toward the front wheel as shown in FIG. 9 when the turning characteristic of the vehicle is the understeer (US).

That is, as shown in FIG. 9, the turning stabilization cooperative controller 310 may weaken the damping force of the electronic controlled suspension (ECS) on the front wheel side to be in a soft state (S) and strengthen the damping force of the electronic controlled suspension (ECS) on the rear wheel side to be in a hard state (H), increasing the load movement toward the front wheel to increase the grip force of the tire with respect to the ground on the front wheel side.

As described above, as a roll stiffness in the front wheel may be reduced by weakening the damping force on the front wheel side and a roll stiffness in the rear wheel may be increased by strengthening the damping force on the rear wheel, the yaw moment generated by the braking torque of the electric motor may be reinforced.

In FIG. 9, the roll stiffnesses in the front wheel and the rear wheel before the cooperative control is performed is indicated by dotted arrows, and a fact that the roll stiffness of the front wheel is reduced and the roll stiffness of the rear wheel is increased as the front wheel becomes in the soft state (S) and the rear wheel becomes in the hard state (H) by the turning stabilization cooperative controller 310 is indicated by solid arrows. Furthermore, a lateral force $\Delta F_y$ which is additionally generated on the front wheel and the rear wheel by such control of the electronic controlled suspension (ECS) is indicated by a thick arrow directed to a right side of the vehicle.

In the present connection, because an additional lateral force generated on the front wheel side becomes greater than an additional lateral force generated on the rear wheel side by the load movement toward the front wheel, a yaw moment $\Delta M_{z,ECS}$ may be additionally generated by control of the electronic controlled suspension (ECS) as shown in Mathematical Equation 7 below.

Accordingly, the final yaw moment applied to the vehicle to improve the turning characteristic becomes a sum of a yaw moment $M_{motor}$ generated by the braking control of the electric motor and the yaw moment $\Delta M_{z,ECS}$ generated by the cooperative control of the electronic controlled suspension. Therefore, not only a yaw moment that exceeds the limit in the braking torque of the electric motor may be realized, but also, the yaw moment that should be generated by the electric motor may be allotted even within the limit in the braking torque of the electric motor.

$$\Delta M_{z,ECS} = \Delta F_{yf} * l_f - \Delta F_{yr} * l_r$$

$$M_{z,desired} = M_{motor} + \Delta M_{z,ECS} \quad \text{[Mathematical Equation 7]}$$

Figure 10:
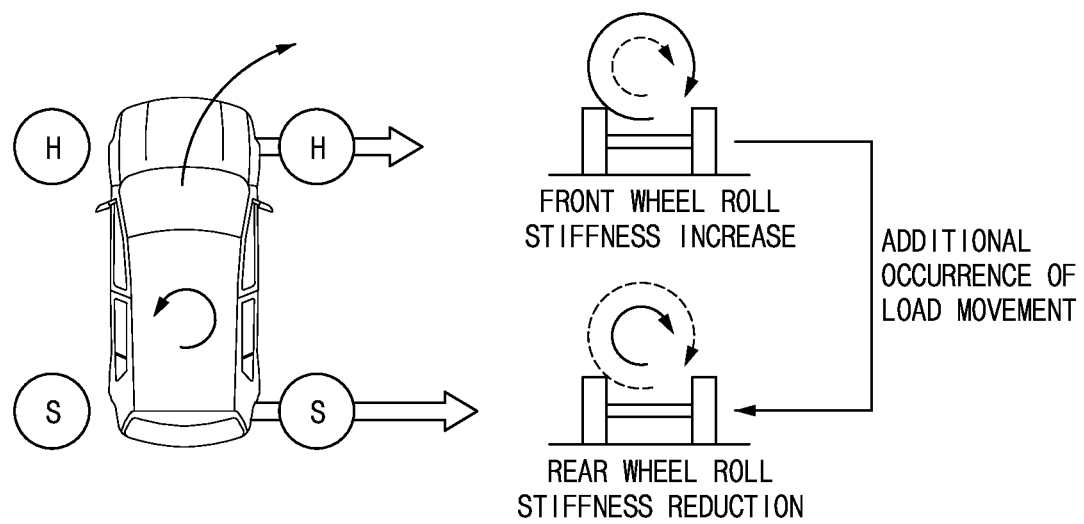
FIG. 10 is a schematic diagram illustrating improvement of an OS phenomenon by control of an electric motor and ECS cooperative control according to various exemplary embodiments of the present invention.

Furthermore, when the turning characteristic of the vehicle is the oversteer (OS), the turning stabilization cooperative controller 310 may perform control to increase the load movement toward the rear wheel to increase the grip force of the tire with respect to the ground on the rear wheel side as shown in FIG. 10.

That is, as shown in FIG. 10, the turning stabilization cooperative controller 310 may strengthen the damping force of the electronic controlled suspension (ECS) on the front wheel side to become in the hard state (H) and weaken the damping force of the electronic controlled suspension (ECS) on the rear wheel side to become in the soft state (S), increasing the load movement toward the rear wheel to increase the grip force of the tire with respect to the ground on the rear wheel side.

As the roll stiffness in the rear wheel is reduced by weakening the damping force on the rear wheel and the roll stiffness in the front wheel is increased by strengthening the damping force on the front wheel as described above, the yaw moment generated by the driving torque of the electric motor may be reinforced.

In FIG. 10, the roll stiffnesses in the front wheel and the rear wheel before the cooperative control is performed is indicated by dotted arrows, and a fact that the roll stiffness of the front wheel is increased and the roll stiffness of the rear wheel is reduced as the front wheel becomes in the hard state (H) and the rear wheel becomes in the soft state (S) by the turning stabilization cooperative controller 310 is indicated by solid arrows. Furthermore, the lateral force $\Delta F_y$, which is additionally generated on the front wheel and the rear wheel by such control of the electronic controlled suspension (ECS) is indicated by a thick arrow directed to the right side of the vehicle.

In the present connection, because the additional lateral force generated on the rear wheel side becomes greater than the additional lateral force generated on the front wheel side by the load movement toward the rear wheel, the yaw moment $\Delta M_{z,ECS}$ may be additionally generated by the control of the electronic controlled suspension (ECS) as shown in Mathematical Equation 8 below), which is the same as in the case of the understeer (US).

$$\Delta M_{z,ECS} = \Delta F_{yr} * l_r - \Delta F_{yf} * l_f$$

$$M_{z,desired} = M_{motor} + \Delta M_{z,ECS} \quad \text{[Mathematical Equation 8]}$$

Furthermore, the cooperative control module 300 may further include a behavior stabilization cooperative controller 320 that additionally controls the electric motor and the electronic controlled suspension (ECS) to stabilize a pitch/roll behavior of the vehicle, which is incidental to the braking torque or the driving torque generated by the electric motor to improve the turning characteristic. When a pitch/roll rate of the vehicle exceeds a certain threshold, the behavior stabilization cooperative controller may contribute to stabilize the pitch/roll behavior.

That is, the behavior stabilization cooperative controller 320 is for stabilizing the pitch/roll behavior caused in a process of realizing the yaw moment for improving the turning characteristic, so that the behavior stabilization cooperative controller 320 performs control such that driving opposite to the control added to improve the turning characteristic may be performed.

As such, although the control opposite to the improvement of the turning characteristic is performed by the behavior stabilization cooperative controller 320, as the cooperative control for the behavior stabilization is to solve the phenomenon caused by the control for improving the turning characteristic, a certain time interval exists between time points at which the two controls are performed, avoiding collision of the two control amounts.

Figure 11:
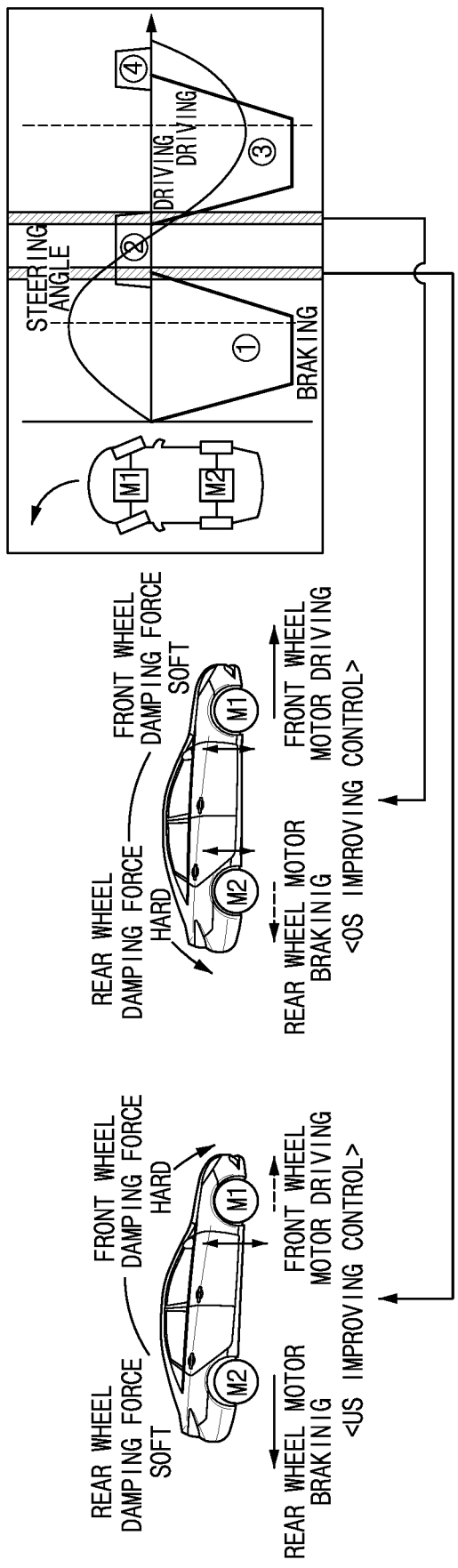
FIG. 11 is an exemplary diagram illustrating control timing at which pitch/roll behavior control is performed according to various exemplary embodiments of the present invention.
Figure 12A:
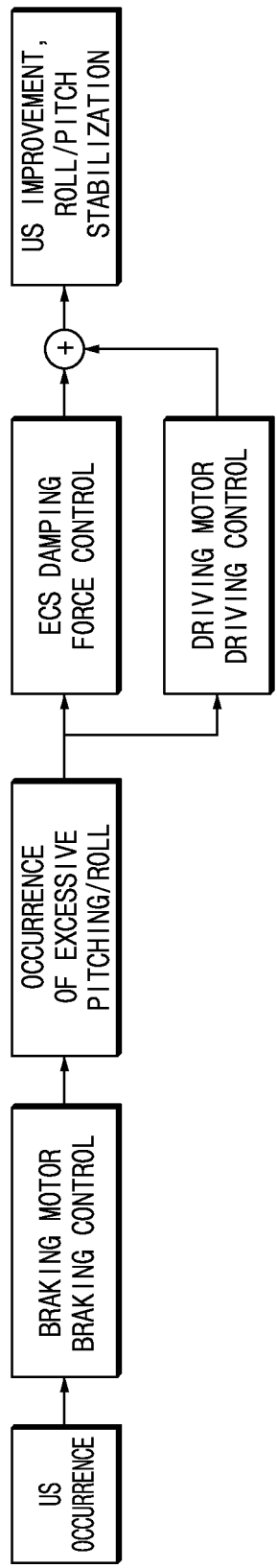
FIG. 12A and FIG. 12B are conceptual diagrams illustrating stabilization of a pitch/roll behavior according to various exemplary embodiments of the present invention.
Figure 12B:
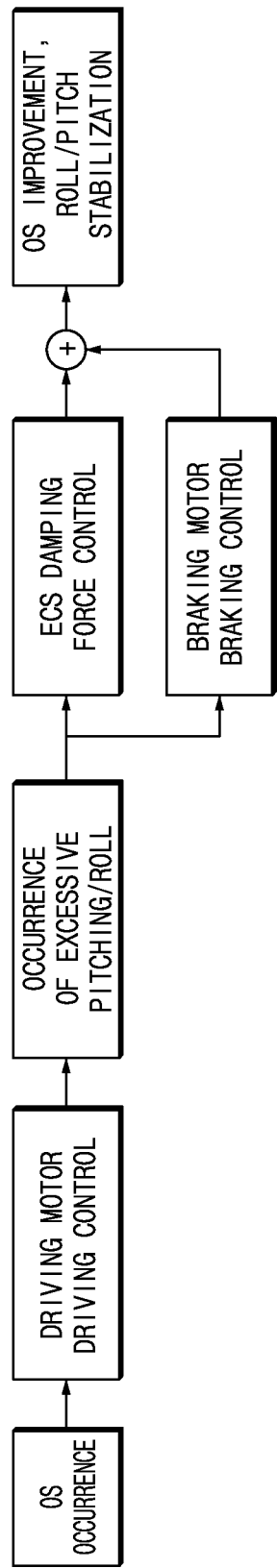

In the present connection, in a graph shown in FIG. 11, transition sections in which the control for the behavior stabilization is performed are indicated by vertical thick lines. Furthermore, a fact that the behavior stabilization control is performed in each transition section in the braking control of the electric motor configured for improving the US or in the driving control of the electric motor configured for improving the OS is indicated by an arrow connected to a vehicle drawing on one side from a bottom of the graph.

Figure 14A:
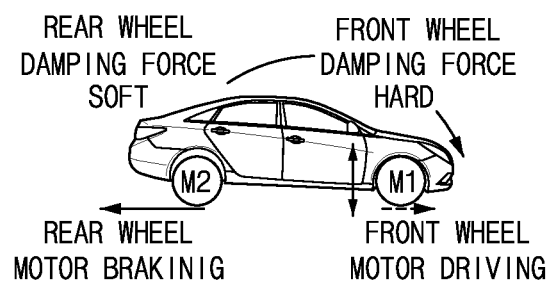
FIG. 14A and FIG. 14B are exemplary views exemplarily illustrating that pitch/roll behavior control is performed in a 4WD electric vehicle by control of an electric motor and ECS cooperative control according to various exemplary embodiments of the present invention.

In the four wheel drive (4WD) vehicle disposed with both the driving motor M1 and the braking motor M2, when the turning characteristic of the vehicle is the understeer (US), as shown in FIG. 14A, as the load of the vehicle is biased toward the front wheel (indicated by a curved arrow pointing toward the front wheel) by the braking torque (indicated by 'rear wheel motor braking' with a solid arrow in FIG. 14A) generated by the braking motor, incidental movements such as pitching, rolling, and the like may occur.

Accordingly, to stabilize a vehicle body behavior caused by such rolling and pitching, the behavior stabilization cooperative controller 320 performs control to not only additionally generate the driving torque (indicated by 'front wheel motor driving' with a dotted arrow near the front wheel) to the driving motor, but also strengthen the damping force of the electronic controlled suspension (ECS) on the front wheel side to be in the hard state and weaken the damping force of the electronic controlled suspension (ECS) on the rear wheel side to be in the soft state.

Accordingly, the vehicle body behavior which is biased toward the front wheel is distributed to the electronic controlled suspension (ECS) on the rear wheel side in the soft state while being supported by the electronic controlled suspension (ECS) on the front wheel side in the hard state, so that the vehicle body behavior may be stabilized.

Figure 14B:
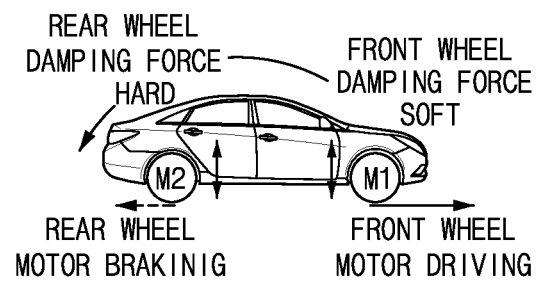

Furthermore, when the turning characteristic of the vehicle is the oversteer (OS), as shown in FIG. 14B, as the vehicle is biased toward the rear wheel (indicated by a curved arrow pointing toward the rear wheel) by the driving torque (indicated by 'front wheel motor driving' with a solid arrow in FIG. 14B) generated by the driving motor, incidental movements such as the pitching, the rolling, and the like may occur.

Accordingly, to stabilize the vehicle body behavior caused by such rolling and pitching, the behavior stabilization cooperative controller 320 performs control to not only additionally generate the braking torque (indicated by 'rear wheel motor braking' with a dotted arrow near the rear wheel) to the braking motor, but also strengthen the damping force of the electronic controlled suspension (ECS) on the rear wheel side to be in the hard state and weaken the damping force of the electronic controlled suspension (ECS) on the front wheel side to be in the soft state.

To stabilize the vehicle body behavior caused by the rolling or the pitching as described above, the control amount for controlling the driving or the braking of the electric motor including the braking motor and the driving motor or controlling the damping force of the electronic controlled suspension (ECS) may be determined as Mathematical Equation 9 below. The motor control amount for driving or braking the electric motor may be added in a level of less than about 30% of the braking torque or the driving torque applied to improve the turning characteristic. In FIG. 14A and FIG. 14B, such magnitude relationship is schematically represented by indicating the arrows different in size. In the present connection, in Mathematical Equation 9, $C_\varphi$ and $C_\theta$ represent damping coefficients, $h_\varphi$ represents a roll center, and ho represents a pitch center.

Roll control moment: $M_{\phi,C} = -mh_\phi a_y + c_\phi \dot{\theta}(c_\theta = \text{hard/soft})$ Pitch control moment: $M_{\theta,C} = mh_\theta a_x + c_\theta \dot{\theta}(c_\theta = \text{hard/soft})$ [Mathematical Equation 9]

In the case of the 4WD vehicle in which the braking and the driving are separately performed by having the two or more electric motors, the motor control amount for generating the driving torque and the braking torque generated to stabilize the vehicle body behavior caused by the rolling or the pitching by the behavior stabilization cooperative controller may also be applied to the electric motor together.

To the present end, in the case of the understeer (US) state, the behavior stabilization cooperative controller 320 may perform control to generate the driving torque for stabilizing the behavior in the driving motor by supplying the generated motor control amount. Furthermore, in the case of the oversteer (OS) state, the behavior stabilization cooperative controller 320 may perform control to generate the braking torque for stabilizing the behavior in the rear motor by supplying the generated motor control amount.

In performing the control for stabilizing the behavior of the vehicle body by the behavior stabilization cooperative controller 320 as described above, during the behavior of the vehicle body affected by the pitching or the rolling, the pitching is greatly affected by a vertical acceleration ax acting in a vertical direction thereof, and rolling is greatly affected by a lateral acceleration ay acting in a lateral direction thereof.

Figure 13:
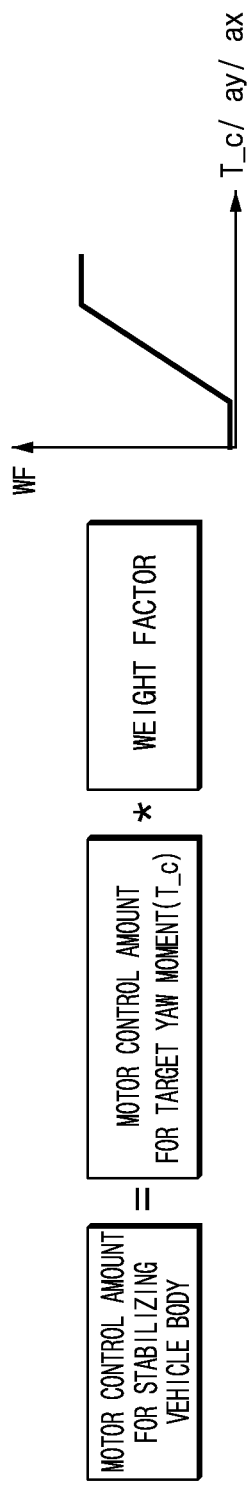
FIG. 13 is an exemplary view exemplarily illustrating that a motor control amount applied to a motor is corrected according to various exemplary embodiments of the present invention.

Accordingly, as shown in FIG. 13, in determining the motor control amount of the electric motor configured for stabilizing the vehicle body by the behavior stabilization cooperative controller 320, the determination may be performed by reflecting the perpendicular acceleration ax, which is a dominating factor of a pitch performance, and the lateral acceleration ay, which is a dominating factor of a roll performance, to a motor control amount T_c for realizing the target yaw moment determined from the motor control amount determining device as weight factors.

Figure 15A:
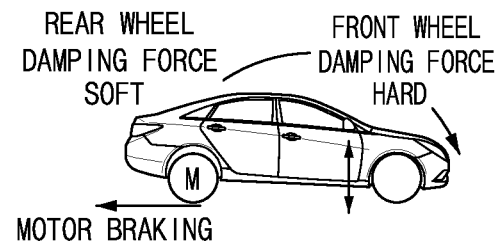
FIG. 15A and FIG. 15B are exemplary views exemplarily illustrating that pitch/roll behavior control is performed in a 2WD electric vehicle by control of an electric motor and ECS cooperative control according to various exemplary embodiments of the present invention.
Figure 15B:
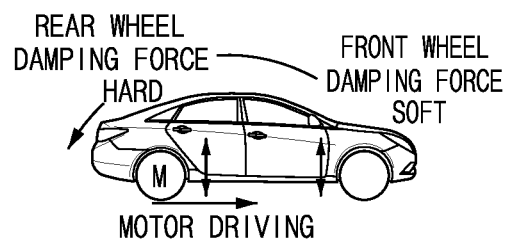

In the case of the four wheel drive (4WD) vehicle disposed with the driving motor M1 and the braking motor M2 that are separate from each other as described above, as shown in FIGS. 12A, 12B, 14A and 14B, the driving control of the driving motor or the braking control of the braking motor may be achieved in cooperation with the damping force control in the electronic controlled suspension (ECS). However, in the case of the two wheel drive (2WD) vehicle disposed with only the single electric motor "M" as shown in FIG. 15A and FIG. 15B, the pitch/roll behavior may be suppressed by only the control of the electronic controlled suspension (ECS) without additional control of the electric motor, stabilizing the behavior of the vehicle body.

As such, the excessive pitching or rolling caused by the control amount applied to improve the turning characteristic may be removed by the driving or the braking of the electric motor and the damping force cooperative control of the electronic controlled suspension (ECS), so that the sense of heterogeneity that the driver feels during the turning motion may be minimized.

Next, a method for improving the turning motion of the vehicle according to various exemplary embodiments of the present invention will be described with reference to FIGS. 16 to 18.

Figure 16:
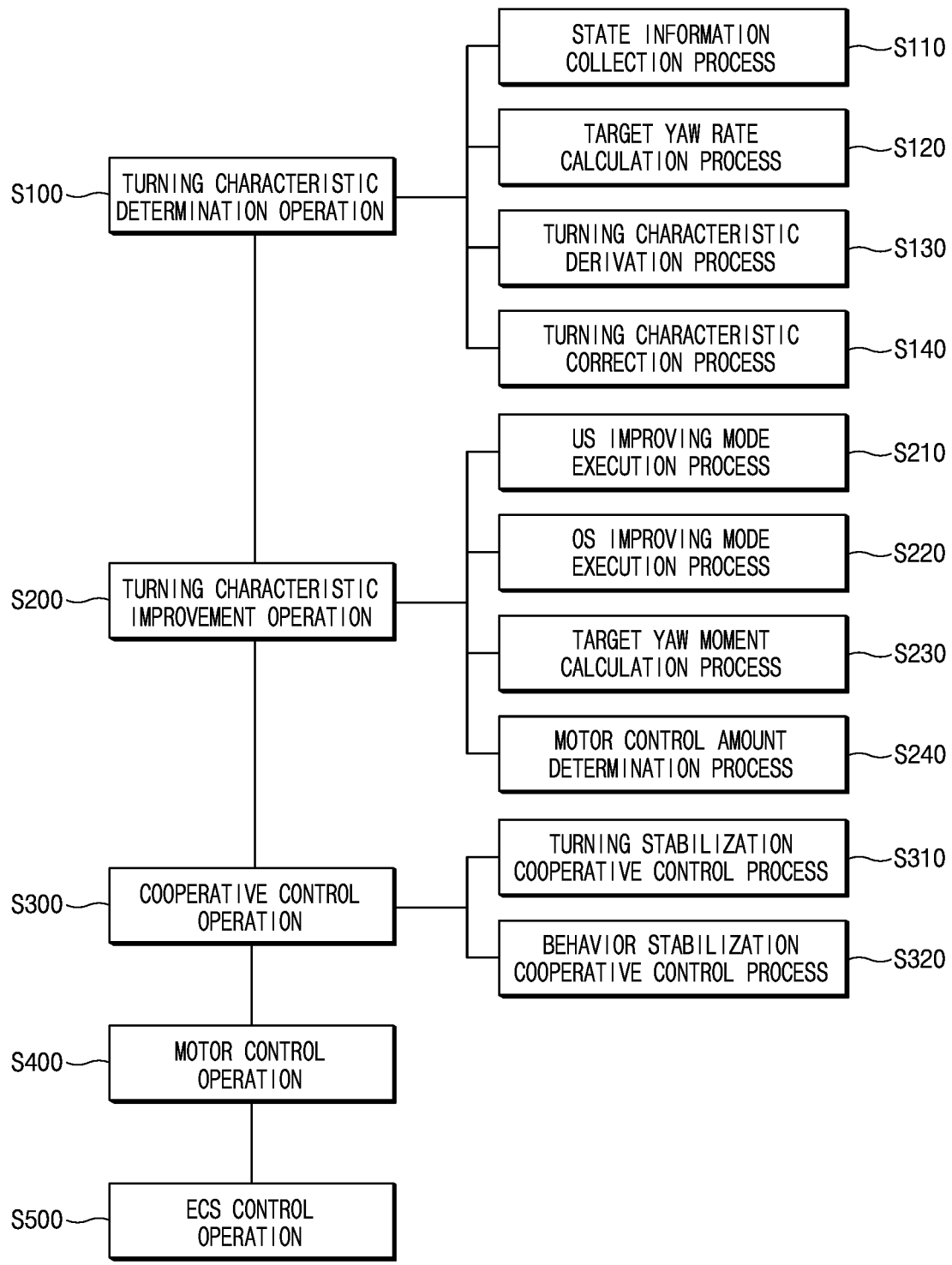
FIG. 16 is a block diagram of a method for improving a turning motion of a vehicle according to various exemplary embodiments of the present invention.
Figure 17:
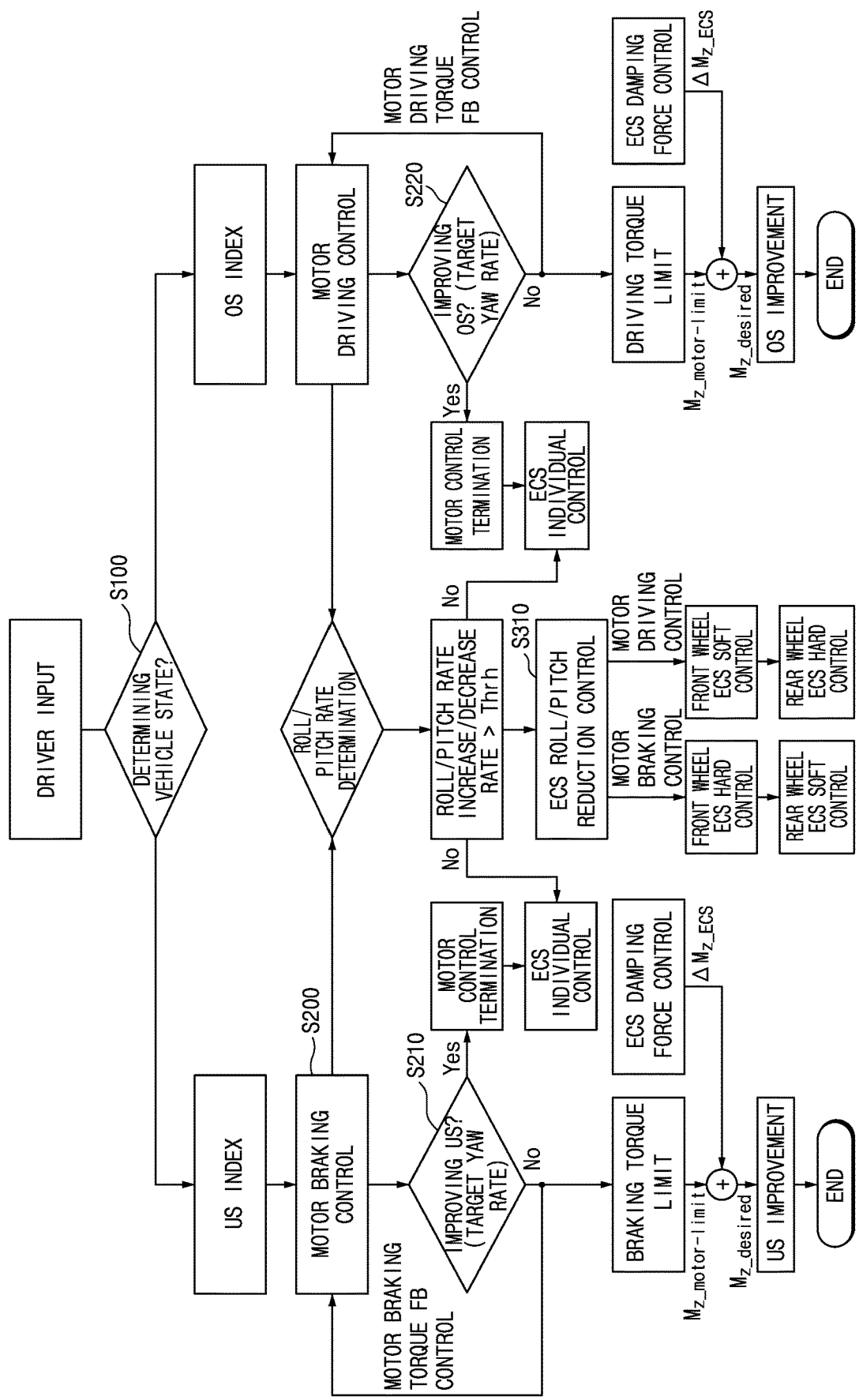
FIG. 17 is a flowchart illustrating a process of performing electric motor control and ECS cooperative control for improving a turning motion in a 2WD electric vehicle according to various exemplary embodiments of the present invention.
Figure 18:
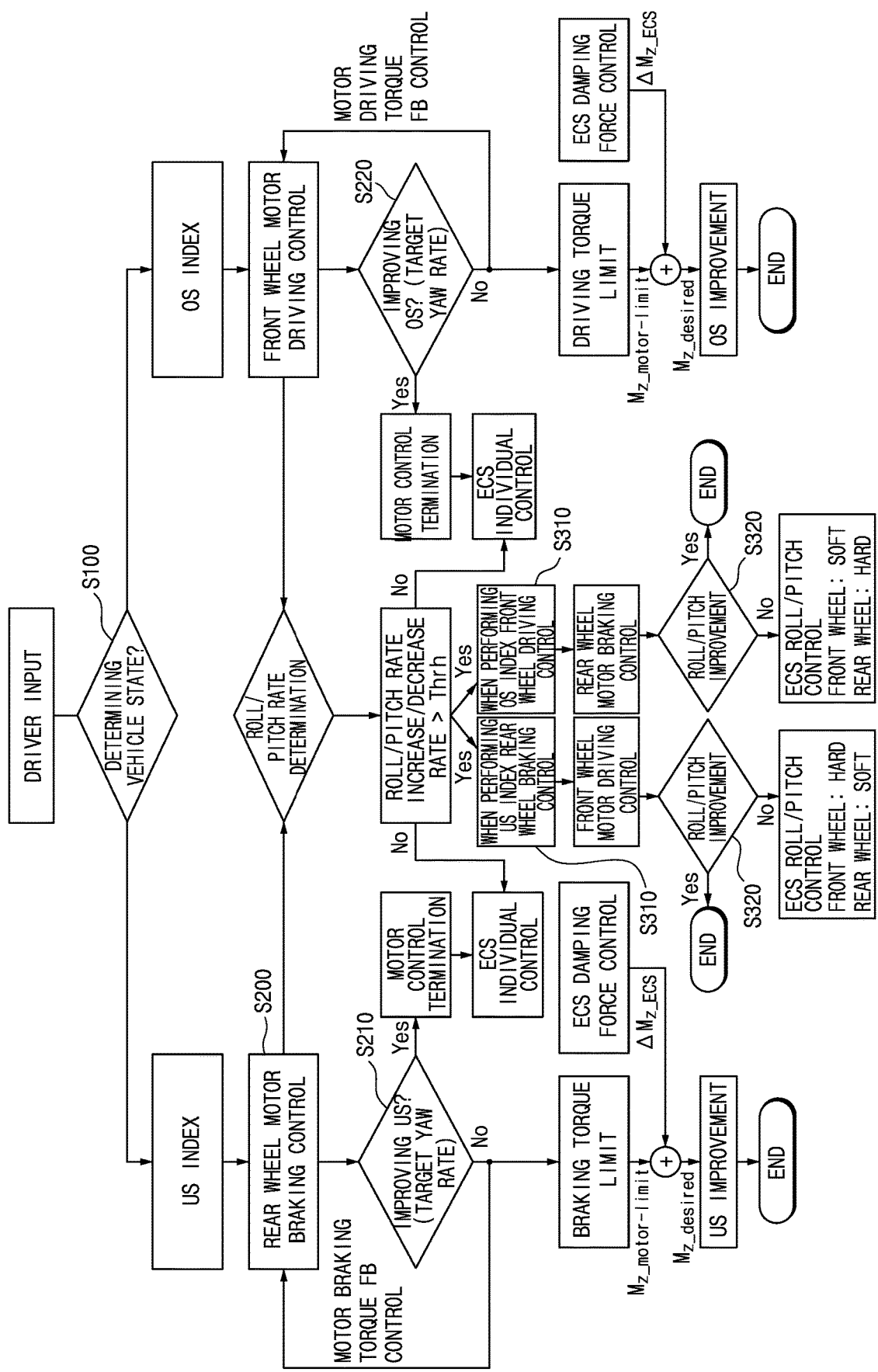
FIG. 18 is a flowchart illustrating a process of performing electric motor control and ECS cooperative control for improving a turning motion in a 4WD electric vehicle according to various exemplary embodiments of the present invention.

FIG. 16 is a block diagram of a method for improving a turning motion of a vehicle according to various exemplary embodiments of the present invention, FIG. 17 is a flowchart illustrating a process of performing electric motor control and ECS cooperative control for improving a turning motion in a 2WD electric vehicle according to various exemplary embodiments of the present invention, and FIG. 18 is a flowchart illustrating a process of performing electric motor control and ECS cooperative control for improving a turning motion in a 4WD electric vehicle according to various exemplary embodiments of the present invention.

Referring to FIG. 16, the method for improving the turning motion of the vehicle according to various exemplary embodiments of the present invention may include a turning characteristic determination operation (S100) of determining whether the turning characteristic of the vehicle is the understeer (US) state or the oversteer (OS) state based on the information for identifying the travel situation of the vehicle, a turning characteristic improvement operation (S200) of determining the target yaw moment required to improve the turning characteristic of the vehicle and controlling whether to brake or drive the electric motor to realize the determined target yaw moment, and a cooperative control operation (S300) of controlling the damping force of the electronic controlled suspension (ECS) to cause the load movement of the vehicle which may contribute to the realization of the target yaw moment.

Furthermore, the method may further include a motor control operation (S400) of generating the braking torque or the driving torque configured for generating the yaw moment for improving the turning characteristic by performing the braking or driving control by applying the motor control amount determined in the turning characteristic improvement operation (S200) to the electric motor of the vehicle, and an ECS control operation (S500) of generating the load movement that contributes to the yaw moment generation by controlling the damping force by applying the cooperative control amount determined in the cooperative control operation to the electronic controlled suspension (ECS) of the vehicle.

In the present connection, the turning characteristic determination operation (S100) may include a state information collection process (S110) of obtaining the at least one of the information allowing the turning motion situation of the vehicle to be identified, including the vehicle speed, the steering angle, the lateral jerk, the yaw rate, and the lateral slip angle of the vehicle through the reception from the various sensors or through the estimation. In the state information collection process (S110), the lateral slip angles of the front wheel and the rear wheel may be estimated or the lateral acceleration or the lateral jerk may be estimated based on the information obtained from the various sensors.

Furthermore, the turning characteristic determination operation (S100) may further include a target yaw rate calculation process (S120) of determining the target yaw rate intended for the turning motion by the vehicle in the travel based on the at least one information related to the vehicle speed and the steering angle.

Furthermore, the turning characteristic determination operation (S100) may further include a turning characteristic derivation process (S130) of determining the difference between the target yaw rate and the current yaw rate of the vehicle to determine the yaw rate error amount, and utilizing the yaw rate error amount and the difference in the magnitude between the lateral slip angle of the front wheel and the lateral slip angle of the rear wheel to determine whether the turning characteristic of the vehicle is the understeer (US) state or the oversteer (OS) state.

Accordingly, in the turning characteristic derivation process (S130), when the front wheel lateral slip angle is greater than the rear wheel lateral slip angle, the turning characteristic of the vehicle may be determined as the understeer (US) state, and when the rear wheel lateral slip angle is greater than the front wheel lateral slip angle, the turning characteristic of the vehicle may be determined as the oversteer (OS) state. In the present connection, in the turning characteristic derivation process (S130), the yaw rate error amount may be compared with the certain threshold to determine whether the turning characteristic is in the severe state or the normal state, and the result may be determined as the turning characteristic index US INDEX or OS INDEX.

Furthermore, the turning characteristic determination operation (S100) may further include a turning characteristic correction process (S140) of correcting the turning characteristic index determined in the turning characteristic derivation process by reflecting the at least one of the vehicle speed, the lateral acceleration, and/or the lateral jerk to finally determine the corrected turning characteristic index. Accordingly, the state of the turning characteristic index may be changed by reflecting the turning will of the driver in deriving the turning characteristic.

The turning characteristic improvement operation (S200) may include a US improving mode execution process (S210) of performing the control such that the braking torque is generated in the electric motor of the vehicle to generate the target yaw moment required for improving the turning characteristic when the turning characteristic is the understeer (US) state, and an OS improving mode execution process (S220) of performing the control such that the driving torque is generated in the electric motor of the vehicle to generate the target yaw moment required for improving the turning characteristic when the turning characteristic is the oversteer (OS) state.

Furthermore, the turning characteristic improvement operation (S200) may further include a target yaw moment calculation process (S230) of determining the target yaw moment to be realized in the vehicle in the turning motion to improve the turning characteristic of the vehicle, and a motor control amount determination process (S240) of determining the motor control amount to be applied to the electric motor to generate the motor torque (the braking torque or the driving torque) required to realize the target yaw moment.

Accordingly, when the turning characteristic of the vehicle is the understeer (US), the braking control may be performed such that the braking torque is generated in the electric motor to increase the grip force of the front wheel with respect to the ground by the US improving mode execution process (S210). Furthermore, when the turning characteristic of the vehicle is the oversteer (OS), each motor control amount for performing the driving control such that the driving torque may be generated in the electric motor to increase the grip force of the rear wheel with respect to the ground by the OS improving mode execution process (S220) may be determined in the motor control amount determination process (S240).

In the present connection, in the US improving mode execution process (S210), in the case of the two wheel drive (2WD) vehicle having only the single electric motor, both the braking and the driving are performed by the single electric motor, so that the motor control amount for generating the braking torque determined in the motor control amount determination process (S240) may be applied as the control signal for the single electric motor.

Furthermore, in the case of the four wheel drive (4WD) vehicle having the two or more electric motors, the braking and the driving are respectively performed in the electric motors, so that the motor control amount for generating the braking torque determined in the motor control amount determination process (S240) may be applied as the control signal for the braking motor (in various exemplary embodiments of the present invention, the rear wheel motor is referred to as the electric motor in charge of the braking) in charge of the braking.

Similarly, in the OS improving mode execution process (S220), in the case of the two wheel drive (2WD) vehicle, the motor control amount for generating the driving torque determined in the motor control amount determination process (S240) may be applied as the control signal for the single electric motor.

Furthermore, in the case of the four wheel drive (4WD) vehicle, the motor control amount for generating the driving torque determined in the motor control amount determination process (S240) may be applied as the control signal for the driving motor (in various exemplary embodiments of the present invention, the front wheel motor is referred to as the electric motor in charge of the driving) in charge of the driving.

Furthermore, in the target yaw moment calculation process (S230), the target yaw moment $M_z$ may be determined using the slip angle β and the yaw angle γ of the vehicle and the front wheel steering angle $δ_f$ and the rear wheel steering angle $δ_r$ of the vehicle based on the bicycle model.

In the target yaw moment calculation process (S230), the target yaw moment may be determined using the sliding mode control (SMC) based on the bicycle model.

Furthermore, in the motor control amount determination process (S240), after expressing the target yaw moment $M_z$ to be realized at the center of mass of the vehicle as the relational expression of the force acting on the tire, the tire vertical load Fz, the tire lateral force Fy, and the tire driving force Fx that should act on each tire of the vehicle may be determined to determine the tire driving force $F_x$ that should be generated to realize the target yaw moment $M_z$.

Thereafter, in the motor control amount determination process (S240), the braking torque or the driving torque that should be realized in the electric motor to follow the target yaw moment $M_z$ may be determined from the relationship between the tire driving force and the vehicle speed, and the braking torque or the driving torque may be determined as the motor control amount.

Furthermore, the cooperative control operation (S300) may include a turning stabilization cooperative control process (S310) of controlling the damping force of the electronic controlled suspension (ECS) to contribute to the realization of the target yaw moment for improving the turning characteristic by increasing the load movement toward the front wheel or the rear wheel of the vehicle in the turning motion.

As such, because the yaw moment may be reinforced by the turning stabilization cooperative control process (S310), not only the yaw moment equal to or above the limit in the braking torque or the driving torque which may be generated in the electric motor may be generated, but also the yaw moment required for improving the turning characteristic even within the range of such a limit may be generated in the allotting manner.

To this end, in the turning stabilization cooperative control process (S310), in realizing the target yaw moment required to improve the turning characteristic of the vehicle, in addition to the yaw moment generated by the braking torque or the driving torque generated by the electric motor, the cooperative control amount for controlling the damping force of the electronic controlled suspension (ECS) may be determined to reinforce the yaw moment by increasing the grip force of the tire with respect to the ground on the front wheel side or the rear wheel side.

Accordingly, in the turning stabilization cooperative control process (S310), when the turning characteristic of the vehicle is the understeer (US), the control may be performed such that the damping force of the electronic controlled suspension (ECS) on the front wheel side is weakened to be in the soft state (S) and the damping force of the electronic controlled suspension (ECS) on the rear wheel side is strengthened to be in the hard state (H) to increase the grip force of the tire with respect to the ground on the front wheel side by increasing the load movement toward the front wheel.

Furthermore, in the turning stabilization cooperative control process (S310), when the turning characteristic of the vehicle is the oversteer (OS), the control may be performed such that the damping force of the electronic controlled suspension (ECS) on the front wheel side is strengthened to be in the hard state (H) and the damping force of the electronic controlled suspension (ECS) on the rear wheel side is weakened to be in the soft state (S) to increase the grip force of the tire with respect to the ground on the rear wheel side by increasing the load movement toward the rear wheel.

As such, the additional yaw moment generated by the difference in the lateral force caused by controlling the damping force of the electronic controlled suspension (ECS) in the turning stabilization cooperative control process (S310) may contribute to the improvement of the turning characteristic together with the yaw moment generated by the braking torque or the driving torque in the electric motor.

Furthermore, the cooperative control operation (S300) may further include a behavior stabilization cooperative control process (S320) of additionally controlling the electric motor and the electronic controlled suspension (ECS) to stabilize the pitch/roll behavior of the vehicle which is incidentally generated by the braking torque or the driving torque generated in the electric motor to improve the turning characteristic.

In such behavior stabilization cooperative control process (S320), when the turning characteristic is the understeer (US), the control may be performed not only to additionally generate the driving torque to the electric motor, but also to strengthen the damping force of the electronic controlled suspension (ECS) on the front wheel side to be in the hard state and weaken the damping force of the electronic controlled suspension (ECS) on the rear wheel side to be in the soft state.

Furthermore, in such behavior stabilization cooperative control process (S320), when the turning characteristic is the oversteer (OS), the control may be performed not only to additionally generate the braking torque to the electric motor, but also to strengthen the damping force of the electronic controlled suspension (ECS) on the rear wheel side to be in the hard state and weaken the damping force of the electronic controlled suspension (ECS) on the front wheel side to be in the soft state.

In the present connection, in the behavior stabilization cooperative control process (S320), in the case of the four wheel drive (4WD) vehicle provided with both the driving motor M1 and the braking motor M2, as described above, the driving control in the driving motor or the braking control in the braking motor may be performed together in cooperation with the damping force control in the electronic controlled suspension (ECS). However, in the case of the two wheel drive (2WD) vehicle having only the single electric motor "M", the behavior of the vehicle body may be stabilized by suppressing the pitch/roll behavior only by the control of the electronic controlled suspension (ECS) without the additional control of the electric motor.

As such, flowcharts indicating that the turning characteristic is improved by generating the target yaw rate by controlling the braking of the electric motor in the US improving mode execution process (S210) based on the turning characteristic of the vehicle determined in the turning characteristic determination operation (S100) and that the turning characteristic is improved by generating the target yaw rate by controlling the driving of the electric motor in the OS improving mode execution process (S220) are shown in FIGS. 17 and 18.

FIGS. 17 and 18 illustrate that the cooperative control of the electronic controlled suspension (ECS) is performed when the target yaw moment is not able to be sufficiently realized because of the limitation of the braking torque or the driving torque generated by the electric motor, but the present invention is not limited thereto, and the cooperative control may be performed to generate the yaw moment in the allotting manner as described above.

Furthermore, FIGS. 17 and 18 illustrate that, in the case of the 2WD vehicle, the pitch/roll rate of the vehicle caused by the braking control or the driving control of the electric motor configured for improving the turning characteristic is determined, and when an increase/decrease rate thereof is greater than a certain threshold Thrh, the behavior stabilization cooperative control process (S320) which may reduce such pitch/roll behavior is performed.

In the present connection, in the case of the 2WD vehicle, as shown in FIG. 17, the behavior stabilization cooperative control process (S320) may be performed only with the damping force control of the electronic controlled suspension (ECS). However, in the case of the 4WD vehicle, as shown in FIG. 18, the behavior stabilization cooperative control process (S320) may be performed by the cooperative control of the electric motor and the electronic controlled suspension (ECS).

Accordingly, FIG. 18 illustrates that the behavior stabilization cooperative control process (S320) is performed in cooperation of the driving control in the front wheel motor, which is the driving motor, and the damping force control in the electronic controlled suspension (ECS) in the understeer state (US INDEX), and is performed in cooperation of the braking control in the rear wheel motor, which is the braking motor, and the damping force control in the electronic controlled suspension (ECS) in the oversteer state (OS INDEX).

The description above is merely illustrative of the technical idea of the present invention, and various modifications and changes may be made by those skilled in the art without departing from the essential characteristics of the present invention.

Therefore, the exemplary embodiments included in various exemplary embodiments of the present invention are not intended to limit the technical idea of the present invention but to illustrate the present invention, and the scope of the technical idea of the present invention is not limited by the embodiments. The scope of the present invention may be construed as being covered by the scope of the appended claims, and all technical ideas falling within the scope of the claims may be construed as being included in the scope of the present invention.

The present invention allows the turning characteristic to be improved by the cooperative control of the electric motor and the electronic controlled suspension (ECS), so that the yaw moment may be realized to a degree beyond a limit of the braking torque or the driving torque generated by the electric motor, improving agility and the turning stability of the vehicle during the turning motion.

Furthermore, the present invention may prevent excessive braking torque or driving torque from being applied to the electric motor to realize the target yaw rate for improving the turning characteristic, so that travel stability may be improved by minimizing a sense of heterogeneity that a driver feels during the turning motion.

Furthermore, various effects that are directly or indirectly recognized through the present document may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for improving a turning motion of a vehicle, the device comprising:
    a turning characteristic determination module configured to determine whether a turning characteristic of the vehicle is an understeer (US) state or an oversteer (OS) state according to information for identifying a travel situation of the vehicle;
    a turning characteristic improvement module configured to determine a target yaw moment required to improve the turning characteristic of the vehicle and determine a motor control amount for realizing the determined target yaw moment to control whether to brake or drive an electric motor of the vehicle; and
    a cooperative control module configured to control a damping force of an electronic controlled suspension (ECS) to cause a load movement of the vehicle configured for contributing to the realization of the target yaw moment,
    wherein the turning characteristic improvement module includes a motor control amount determining device, and
    wherein the motor control amount determining device is configured to represent the target yaw moment as a sum of a lateral force $F_y$ acting on a tire and a driving force $F_x$, then, determine a motor torque including a braking torque or a driving torque that is realized at the electric motor from a relational expression between the driving force $F_x$ and a vehicle speed V representing an output P of the electric motor and a relational expression between the motor torque $T_m$ and an angular speed $\omega_m$, and then, determine the determined motor torque as the motor control amount.

2. The device of claim 1, wherein the turning characteristic determination module includes:
    a state information collecting device configured to obtain at least one of information allowing a turning motion situation of the vehicle to be identified, including the vehicle speed, a steering angle, a lateral jerk, a yaw rate, and a lateral slip angle of the vehicle, through reception directly from a plurality of sensors provided on the vehicle or through estimation based on the received information;
    a target yaw rate calculating device configured to determine a target yaw rate intended for the turning motion of the vehicle in travel according to information related to at least one of the vehicle speed and/or the steering angle; and a turning characteristic deriving device configured to determine a difference between the determined target yaw rate and a current yaw rate of the vehicle to determine a yaw rate error amount, then determine whether the turning characteristic of the vehicle is the understeer (US) state or the oversteer (OS) state using the yaw rate error amount and a magnitude difference between a lateral slip angle of a front wheel of the vehicle and a lateral slip angle of a rear wheel of the vehicle to determine a turning characteristic index.

3. The device of claim 2, wherein the turning characteristic determination module further includes:

a turning characteristic correcting device configured to correct the turning characteristic index by reflecting information related to at least one of the vehicle speed, a lateral acceleration, and/or the lateral jerk obtained by the state information collecting device.

4. The device of claim 1, wherein the turning characteristic improvement module includes:

a US improvement controller configured to control the braking torque to be generated from the electric motor of the vehicle to realize the target yaw moment required for improving the turning characteristic when the turning characteristic is the understeer (US) state; and an OS improvement controller configured to control the driving torque to be generated from the electric motor of the vehicle to realize the target yaw moment required for improving the turning characteristic when the turning characteristic is the oversteer (OS) state.

5. The device of claim 1, wherein the turning characteristic improvement module further includes:

a target yaw moment calculating device configured to determine the target yaw moment to be realized in the vehicle in the turning motion to improve the turning characteristic of the vehicle, wherein the motor control amount determining device is further configured to determine the motor control amount to be applied to the electric motor to generate the motor torque required to realize the target yaw moment.

6. The device of claim 4, wherein the vehicle is a four wheel drive (4WD) vehicle, and wherein the turning characteristic improvement module is configured to realize the target yaw moment in the four wheel drive (4WD) vehicle provided with two or more electric motors by generating, by the US improvement controller, the braking torque by applying the motor control amount to a braking motor when the turning characteristic is the understeer (US) state, and by generating, by the OS improvement controller, the driving torque by applying the motor control amount to a driving motor when the turning characteristic is the oversteer (OS) state.

7. The device of claim 5, wherein the target yaw moment calculating device is further configured to determine the target yaw moment required to improve the turning characteristic of the vehicle based on a bicycle model.

8. The device of claim 5, wherein the target yaw moment calculating device is further configured to determine the target yaw moment by defining a sliding surface defined using sliding mode control (SMC) as a yaw rate error plane based on a bicycle model.

9. The device of claim 1, wherein the cooperative control module includes:

a turning stabilization cooperative controller configured to control the damping force of the electronic controlled suspension (ECS) to contribute to the realization of the target yaw moment for improving the turning characteristic by increasing the load movement toward a front wheel or a rear wheel of the vehicle in the turning motion.

10. The device of claim 9, wherein the turning stabilization cooperative controller is further configured to perform control to weaken a damping force of an electronic controlled suspension (ECS) on a front wheel side to be in a soft state and strengthen a damping force of an electronic controlled suspension (ECS) on a rear wheel side to be in a hard state when the turning characteristic of the vehicle is the understeer (US) state.

11. The device of claim 9, wherein the turning stabilization cooperative controller is configured to perform control to strengthen a damping force of an electronic controlled suspension (ECS) on a front wheel side to be in a hard state and weaken a damping force of an electronic controlled suspension (ECS) on a rear wheel side to be in a soft state when the turning characteristic of the vehicle is the oversteer (OS) state.

12. The device of claim 1, wherein the cooperative control module includes:

a behavior stabilization cooperative controller configured to additionally control the electric motor and the electronic controlled suspension (ECS) to stabilize a pitch/roll behavior of the vehicle, wherein the pitch/roll behavior is incidental to the braking torque or the driving torque generated by the electric motor to improve the turning characteristic.

13. The device of claim 12, wherein the vehicle is a four wheel drive (4WD) vehicle, and wherein the behavior stabilization cooperative controller is further configured to perform control not only to additionally generate the driving torque to a driving motor, but also to strengthen a damping force of an electronic controlled suspension (ECS) on a front wheel side to be in a hard state and weaken a damping force of an electronic controlled suspension (ECS) on a rear wheel side to be in a soft state when the turning characteristic is the understeer (US) state in the four wheel drive (4WD) vehicle provided with two or more electric motors.

14. The device of claim 12, wherein the vehicle is a four wheel drive (4WD) vehicle, and wherein the behavior stabilization cooperative controller is configured to perform control not only to additionally generate the braking torque to a braking motor, but also to strengthen a damping force of an electronic controlled suspension (ECS) on a rear wheel side to be in a hard state and weaken a damping force of an electronic controlled suspension (ECS) on a front wheel side to be in a soft state when the turning characteristic is the oversteer (OS) state in the four wheel drive (4WD) vehicle provided with two or more electric motors.

15. The device of claim 1, wherein the cooperative control module includes:

a behavior stabilization cooperative controller configured to additionally control the electronic controlled suspension (ECS) to stabilize a pitch/roll behavior of the vehicle, wherein the pitch/roll behavior is incidental to the braking torque or the driving torque generated by the electric motor to improve the turning characteristic.

16. A method for improving a turning motion of a vehicle, the method comprising:
- a turning characteristic determination operation of determining whether a turning characteristic of the vehicle is an understeer (US) state or an oversteer (OS) state according to information for identifying a travel situation of the vehicle;
- a turning characteristic improvement operation of determining a target yaw moment required to improve the turning characteristic of the vehicle and controlling whether to brake or drive an electric motor of the vehicle to realize the determined target yaw moment; and
- a cooperative control operation of controlling a damping force of an electronic controlled suspension (ECS) to cause a load movement of the vehicle configured for contributing to the realization of the target yaw moment,
- wherein the turning characteristic improvement operation including representing the target yaw moment as a sum of a lateral force $F_y$ acting on a tire and a driving force $F_x$, then, determining a motor torque including a braking torque or a driving torque that is realized at the electric motor from a relational expression between the driving force $F_x$ and a vehicle speed V representing an output P of the electric motor and a relational expression between the motor torque $T_m$ and an angular speed $\omega_m$, and then, determining the determined motor torque as a motor control amount.

17. The method of claim 16, wherein the turning characteristic determination operation further includes:
- a turning characteristic derivation process for determining a difference between a target yaw rate determined according to information related to at least one of a vehicle speed or a steering angle and a current yaw rate of the vehicle to determine a yaw rate error amount, then determining whether the turning characteristic of the vehicle is the understeer (US) state or the oversteer (OS) state using the yaw rate error amount and a magnitude difference between a lateral slip angle of a front wheel of the vehicle and a lateral slip angle of a rear wheel of the vehicle to determine a turning characteristic index.

18. The method of claim 16, wherein the cooperative control operation includes:
- a turning stabilization cooperative control process for controlling the damping force of the electronic controlled suspension (ECS) to contribute to the realization of the target yaw moment for improving the turning characteristic by increasing the load movement toward a front wheel or a rear wheel of the vehicle in the turning motion.

19. The method of claim 16, wherein the cooperative control operation includes:
- a behavior stabilization cooperative control process for additionally controlling the electric motor and the electronic controlled suspension (ECS) to stabilize a pitch/roll behavior of the vehicle, wherein the pitch/roll behavior is incidental to the braking torque or the driving torque generated by the electric motor to improve the turning characteristic.

* * * * *